United States Patent
Gaddam

(10) Patent No.: US 12,438,861 B2
(45) Date of Patent: *Oct. 7, 2025

(54) DECENTRALIZED PROCESSING OF INTERACTIONS ON DELIVERY

(71) Applicant: Visa International Service Association, San Francisco, CA (US)

(72) Inventor: Sivanarayana Gaddam, Santa Clara, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/643,254

(22) Filed: Apr. 23, 2024

(65) Prior Publication Data

US 2024/0275773 A1 Aug. 15, 2024

Related U.S. Application Data

(63) Continuation of application No. 17/429,263, filed as application No. PCT/US2019/029802 on Apr. 30, 2019, now Pat. No. 12,003,495.

(51) Int. Cl.
*H04L 9/40* (2022.01)
*G06Q 20/02* (2012.01)
(Continued)

(52) U.S. Cl.
CPC .......... *H04L 63/08* (2013.01); *G06Q 20/027* (2013.01); *H04L 9/14* (2013.01); *H04L 63/10* (2013.01); *H04L 9/50* (2022.05); *H04L 2209/56* (2013.01)

(58) Field of Classification Search
CPC .......... H04L 63/0281; H04L 2209/56; H04L 63/08; H04L 63/10; H04L 9/14;
(Continued)

(56) References Cited

U.S. PATENT DOCUMENTS 6,625,734 B1  9/2003  Marvit et al.
9,503,452 B1  11/2016  Kumar et al.
(Continued)

FOREIGN PATENT DOCUMENTS

CN  109118199 A  1/2019
JP  2008278170 A  * 11/2008
KR  20180017222 A  2/2018

OTHER PUBLICATIONS

U.S. Appl. No. 17/429,263, "Non-Final Office Action", Oct. 5, 2023, 8 pages.
(Continued)

*Primary Examiner* — Trong H Nguyen
(74) *Attorney, Agent, or Firm* — Kilpatrick Townsend & Stockton LLP

(57) ABSTRACT

A method includes generating, by a user device, an initial authorization request message for an interaction to obtain a resource from a resource provider. The user device transmits the initial authorization request message to a first node in a proxy network, wherein the first node processes the initial authorization request message and transmits a routing message to a second node in the proxy network based on the processing of the initial authorization request message, the second node being previously associated with the resource provider. The user device then receives from the second node and stores a pre-authorization approval indicator (PAAI). Upon delivery of the resource by an agent of the resource provider, the user device transmits an authorization request message including the pre-authorization approval indicator, wherein the agent device further processes and transmits the authorization request message to the proxy network for authorization by an authorizing entity.

20 Claims, 6 Drawing Sheets

(51) Int. Cl.
*H04L 9/14* (2006.01)
*H04L 9/00* (2022.01)

(58) Field of Classification Search
CPC ..... H04L 9/50; H04L 63/045; H04L 63/0478; H04L 9/3239; G06Q 20/12; G06Q 20/24; G06Q 30/0601
See application file for complete search history.

(56) References Cited

U.S. PATENT DOCUMENTS

| | | | | |
|---|---|---|---|---|
| 2011/0072502 | A1* | 3/2011 | Song | G06Q 10/10 709/206 |
| 2013/0185210 | A1* | 7/2013 | Dodson | G06Q 20/40 705/44 |
| 2013/0252583 | A1* | 9/2013 | Brown | H04L 63/0807 455/411 |
| 2015/0019443 | A1* | 1/2015 | Sheets | G06Q 20/3829 705/71 |
| 2017/0011396 | A1 | 1/2017 | Desai et al. | |
| 2017/0063834 | A1* | 3/2017 | Gryb | H04L 63/083 |
| 2017/0272240 | A1* | 9/2017 | Bar-El | H04L 9/083 |
| 2018/0005238 | A1 | 1/2018 | Hammad et al. | |
| 2019/0108520 | A1 | 4/2019 | Zeltzer et al. | |

OTHER PUBLICATIONS

U.S. Appl. No. 17/429,263, "Notice of Allowance", Jan. 26, 2024, 12 pages.
CN201980093326.4, "Notice of Decision to Grant", Sep. 18, 2023, 9 pages.
EP19927364.0, "Extended European Search Report", Apr. 7, 2022, 12 pages.
Nunez et al., "Proxy Re-Encryption: Analysis of Constructions and Its Application to Secure Access Delegation", Journal of Network and Computer Applications, vol. 87, Mar. 8, 2017, pp. 193-209.
PCT/US2019/029802, "International Preliminary Report on Patentability", Nov. 11, 2021, 11 pages.
PCT/US2019/029802, "International Search Report and Written Opinion", Jan. 31, 2020, 28 pages.
SG11202108635X, "Written Opinion", Mar. 22, 2024, 9 pages.

* cited by examiner

DECENTRALIZED PROCESSING OF INTERACTIONS ON DELIVERY

CROSS-REFERENCE TO RELATED APPLICATIONS

This application is continuation application of U.S. patent application Ser. No. 17/429,263 filed Aug. 6, 2021, which is a 371 National Phase of PCT Patent Application No. PCT/US2019/029802 filed Apr. 30, 2019, which are incorporated herein by reference in their entirety.

BACKGROUND

Systems and methods for processing transactions between users and resource providers (e.g., merchants) are known. For example, in the case of a payment transaction, a user (e.g., consumer) may browse a merchant's website for goods, add the goods to the cart, input the user's payment credentials (e.g., a primary account number (PAN) data) that correspond to the user's account with an issuer (e.g., a bank who issued the payment credentials to the user)) into the website, and submit the order to be transmitted to a merchant server hosting the merchant website. The merchant server may then forward the transaction details (including the payment credentials) to a payment gateway that is associated with the merchant. The payment gateway may serve as an intermediary to facilitate the payment transaction. The payment gateway may then transmit an authorization request message requesting authorization to the issuer. The issuer can then generate an authorization response message and transmit it to the merchant server via the payment gateway.

In some methods for payment transactions, the user may not be required to pay the merchant until actually taking possession of the goods and having an opportunity to verify that the goods are in acceptable condition. This type of payment transaction model may be known as "Payment on Delivery" (POD). Payment on delivery helps to reduce the possibility of unintended decline of transactions. This might occur in a scenario in which the user receives the goods, but later may become confused and deny that the goods were actually received. Furthermore, in some locations, a merchant may delegate delivery of the goods to a delivery agent, whereby upon delivery, the delivery agent facilitates the actual payment for the goods. In some cases, while the goods are in transit to be delivered, they may become partially damaged or even non-salvageable. In such circumstances, the user may not want to pay for the goods and/or may refuse delivery, in which case the delivery agent and merchant must negotiate to determine who bears the costs.

A number of technical problems related to data security and processing efficiency are also present with respect to conventional payment on delivery type systems and methods. Such issues are addressed by embodiments of the invention.

SUMMARY

Embodiments include improved methods, systems, and computers that can implement improved interaction (e.g., payment) on delivery transactions.

One embodiment includes a method comprising: receiving, by a first node in a proxy network of nodes from a user device, an initial authorization request message for an interaction to obtain a resource from a resource provider, the initial authorization request message comprising an interaction identifier, user data, and an authorization capsule, the authorization capsule being associated with an authorizing entity and comprising risk policies, encrypted credentials of the user, a plurality of re-encryption keys respectively associated with the nodes in the proxy network, and a plurality of node identifiers respectively associated with the re-encryption keys; performing, by the first node, authentication using the user data and the risk policies in the authorization capsule; determining, by the first node, a re-encryption key of the plurality of re-encryption keys using the interaction identifier and the node identifiers in the authorization capsule, the re-encryption key associated with a second node of the proxy network of nodes; re-encrypting, by the first node and utilizing the re-encryption key associated with the second node, the encrypted credentials to form re-encrypted credentials; and transmitting, by the first node to the second node in the proxy network, a routing message comprising the re-encrypted credentials and the interaction identifier, wherein the second node thereafter decrypts the re-encrypted credentials using a secret key of the second node to obtain the plaintext credentials, and then generates and transmits a pre-authorization request message to the authorizing entity for approval, wherein the pre-authorization request message requests pre-authorization prior to a subsequent authorization request message to be transmitted by an agent device of an agent of the resource provider upon delivery of the resource.

Another embodiment includes a first node in a proxy network of nodes, the first node comprising: a processor; and a computer readable medium, coupled to the processor. The computer readable medium comprises code, executable by the processor, for implementing a method. The method comprises: receiving, from a user device, an initial authorization request message for an interaction to obtain a resource from a resource provider, the initial authorization request message comprising an interaction identifier, user data, and an authorization capsule, the authorization capsule being associated with an authorizing entity and comprising risk policies, encrypted credentials of the user, a plurality of re-encryption keys respectively associated with the nodes in the proxy network, and a plurality of node identifiers respectively associated with the re-encryption keys; performing authentication using the user data and the risk policies in the authorization capsule; determining a re-encryption key of the plurality of re-encryption keys using the interaction identifier and the node identifiers in the authorization capsule, the re-encryption key associated with a second node of the proxy network of nodes; re-encrypting, utilizing the re-encryption key associated with the second node, the encrypted credentials to form re-encrypted credentials; and transmitting, to the second node in the proxy network, a routing message comprising the re-encrypted credentials and the interaction identifier, wherein the second node thereafter decrypts the re-encrypted credentials using a secret key of the second node to obtain the plaintext credentials, and then generates and transmits a pre-authorization request message to the authorizing entity for approval, wherein the pre-authorization request message requests pre-authorization prior to a subsequent authorization request message to be transmitted by an agent device of an agent of the resource provider upon delivery of the resource.

Another embodiment includes a method comprising: generating, by a second node in a proxy network, a pair of cryptographic keys, the pair comprising a public key and a secret key; publishing, by the second node, a cryptographic key of the pair to the proxy network, wherein an authorizing entity fetches the cryptographic key from the proxy network and utilizes a secret key of the authorizing entity and the cryptographic key to generate a re-encryption key; receiving, by the second node in the proxy network from a first node in the proxy network, a routing message, the routing message comprising a re-encrypted credentials and an interaction identifier, wherein the re-encrypted credentials are plaintext credentials that are encrypted utilizing the re-encryption key, and the interaction identifier corresponds to an interaction to obtain a resource from a resource provider, the interaction identifier comprising a user device identifier corresponding to a user device; decrypting, by the second node, the re-encrypted credentials using the secret key of the second node to obtain the plaintext credentials; generating, by the second node and based on the interaction identifier, a pre-authorization request message, the pre-authorization request message comprising the plaintext credentials and interaction data corresponding to the interaction; and transmitting, by the second node, the pre-authorization request message to the authorizing entity for approval, wherein the pre-authorization request message requests pre-authorization prior to a subsequent authorization request message to be transmitted by an agent device of an agent of the resource provider upon delivery of the resource.

Another embodiment includes a method comprising: generating, by a user device, an initial authorization request message for an interaction to obtain a resource from a resource provider; transmitting, by the user device to a first node in a proxy network, the initial authorization request message, wherein the first node subsequently processes the initial authorization request message and transmits a routing message to a second node in the proxy network based on the processing of the initial authorization request message, the second node being previously associated with the resource provider; receiving, by the user device from the second node in the proxy network, a pre-authorization approval indicator (PAAI); storing, by the user device; the pre-authorization approval indicator; transmitting, by the user device to an agent device of an agent of the resource provider, upon delivery of the resource by the agent, an authorization request message comprising the pre-authorization approval indicator, wherein the agent device further processes and transmits the authorization request message to the proxy network for authorization by an authorizing entity.

Further details regarding embodiments of the disclosure are described in the Detailed Description and the Figures.

DETAILED DESCRIPTION

Figure 1:
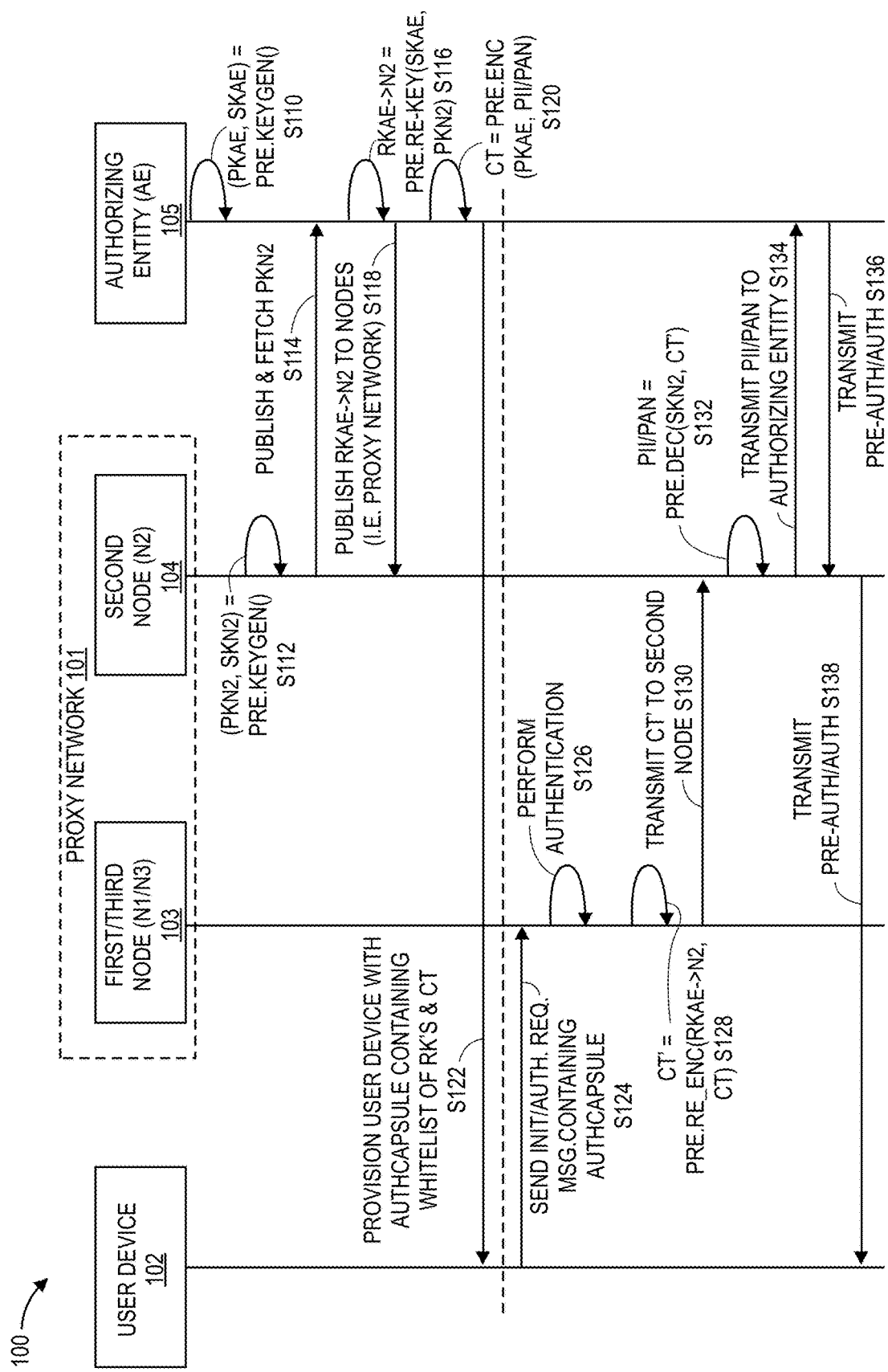
FIG. 1 shows a flow diagram depicting an exemplary message exchange process used to obtain a resource from a resource provider, according to an embodiment.

A number of challenges exist with existing systems and methods for processing transactions that are of the payment on delivery type. For example, in some cases, the user may not trust the merchant with the user's personal information (e.g., PII/PAN data), but still desires to execute a transaction with the merchant. Additionally, even if the user's payment credentials can be encrypted (e.g., using a public key of the bank) when being transmitted to the payment gateway associated with the merchant, the payment gateway may still need to contact a bank server to decrypt the payment credentials (e.g., using the bank's secret key) for further processing of the transaction. This online component (e.g., payment gateway contacting a bank server to decrypt payment credentials per transaction) adds significant complexity and increases infrastructure requirements, for example, when coordinating between multiple payment gateways and multiple bank servers to manage this process for every transaction. Another problem is that even if all the payment gateways were to rely on a single proxy (between the payment gateways and the banks) to facilitate this online component, the single proxy may then be able to accumulate personal information (e.g., shopping patterns) about the user over time, which reduces user privacy. The single proxy may also become a single point of failure for processing e-commerce transactions (e.g., decreasing reliability).

Another challenge exists with methods for processing transactions involving payment on delivery. While payment on delivery may reduce risk for the user, these types of payment arrangements (e.g., between the merchant, the delivery agent, and the user) are more complex than conventional e-commerce transactions as they can include or result in agent insurance, settlement delays, and cash handling procedures. Also, similar to the first problem described above, the user may not trust the merchant's delivery agent with personal information at the time of payment. Yet another problem exists when a user wants to use a specific payment type (e.g., credit card, cryptocurrency, digital wallet, etc.) at the time of payment. It can be time-consuming and error prone for a delivery agent to maintain multiple mechanisms (e.g., multiple applications on an agent device) in order to process different types of payments.

Embodiments can include methods and systems that can facilitate processing transactions between users (e.g., a consumer) and resource providers (e.g., a merchant). In an example, a user, operating a user device such as a mobile phone or a laptop computer, wishes to purchase goods from a merchant's website by using a particular payment method (e.g., credit card, debit card). Additionally, the user wants to pay for the goods at the time of delivery by a delivery agent (e.g., delivery person) of the merchant. A method including three phases may be employed to facilitate processing this example transaction. In a first (deployment) phase, intermediary entities between the user and merchant may be employed and components may be deployed to multiple entities. In a second phase, based on the infrastructure deployed in the first phase, the user may place an order with the merchant and request a pre-authorization from an authorized entity (e.g., bank) in the second phase. Finally, in a later third phase when the goods are delivered to the user, and based on the pre-authorization approval previously received, the user (via a delivery agent device) may request authorization to complete the payment transaction.

Turning to the first phase in greater detail, first, a merchant service provider (e.g., a payment gateway) may be an intermediary who has a pre-existing relationship with the merchant and optionally the issuer of the user's payment device (e.g., credit card). In this case, the payment gateway may be referred to as a "target payment gateway". The target payment gateway may operate a computer and enroll the computer in a proxy network that includes a plurality of nodes, whereby each node of the proxy network corresponds to one or more computers that are operated by (or on behalf of) a distinct payment gateway. The proxy network (PN) may collectively be configured to maintain a blockchain, with each node of the proxy network participating in maintaining the blockchain. (For an example of more details on blockchain technology, see J. Yli-Huumo, D. Ko, S. Choi, S. Park, K. Smolander. Where is Current Research on Blockchain Technology?—A Systematic Review, In PLOS ONE 11(10): e0163477, 2016.) Additionally, each node of the proxy network may include a trusted execution environment (TEE), whereby the trusted execution environment ensures that code and data executed or operated upon within the trusted execution environment are protected with respect to confidentiality and integrity. Second, as part of the enrollment, the target payment gateway may generate a pair of cryptographic keys and publish a cryptographic key of the pair to the proxy network such that the issuer has access to the cryptographic key (e.g., the public key). Third, the issuer may, using the target payment gateway's public key and a private key (also may be known as a secret key) of the issuer, generate a re-encryption key (RK) that is associated with the target payment gateway, and publish the RK to the proxy network. Meanwhile, in a fourth step, the user may, prior to initiating the transaction via the merchant's website, download and install an application (e.g., a mobile banking application or wallet application) onto the user's user device that corresponds to the user's account with the issuer. During the installation/setup process, the issuer may provision the user device with a data container object, which may be an "authorization capsule" (AC). The authorization capsule may contain risk policies determined by the issuer (e.g., policies regarding user behavioral data, a transaction amount ceiling, etc.), a whitelist of RKs (e.g., each RK generated by the issuer and associated with a particular node in the proxy network), a plurality of node identifiers (e.g., each node identifier respectively associated with a RK in the whitelist), and encrypted credentials (e.g., encrypted PII/PAN data) of the user. In embodiments, plaintext credentials may have been encrypted using the issuer's public key to form a ciphertext (CT). The authorization capsule itself may be encrypted by the issuer using a shared cryptographic key that is shared with one or more nodes the proxy network, and may further be associated with the particular user device and application on the user's user device. In a fifth step, the delivery agent of the merchant may also install an application (e.g., a payment on delivery application) on an agent device. The agent device may be a mobile device that is configured to communicate with the user device and transmit transaction data to/from the proxy network. In a sixth step, the merchant server may download and install an application (e.g., JavaScript update) to be able to support transactions that utilize the proxy network.

In the second phase (e.g., pre-authorization phase) that follows the deployment phase, and continuing with the example above, the user places an order on the merchant website and requests pre-authorization from the issuer to pay for the order. In a first step of the second phase, the user selects goods on the merchant website to add to a cart. Second, the user submits the order (e.g., clicking a button on the website). Third, the merchant server then transmits the order information to the proxy network, whereby the order information includes an identification as to which particular node (e.g., target payment gateway node) of the proxy network is associated with the merchant. A reception node of the proxy network receives the order information, generates an interaction identifier (e.g., corresponding to the particular transaction details and the target payment gateway node), and transmits the interaction identifier back to the merchant server. The reception node also transmits the interaction identifier to each node in the proxy network to be stored for future reference. Fourth, the merchant website displays a Quick Response (QR) code encoding the interaction identifier. Fifth, the user scans the QR code via the user device to complete the checkout. Sixth, the scanning of the QR code prompts the user device to transmit to the proxy network, as an initial authorization request message, the interaction identifier, encrypted user metadata (e.g., behavioral metrics, username/password, etc. that is encrypted using the shared cryptographic key of the proxy network), and the authorization capsule that was provisioned on the user device in the first phase. Seventh, a first node of the proxy network receives the data from the user device, and performs several operations, one or more of which may be performed within the trusted execution environment of the first node. These operations include decrypting the authorization capsule and the user metadata (using the shared cryptographic key of the proxy network), and authenticating the transaction based on the risk policies within the authorization capsule and the user metadata, whereby the authentication process produces a proof of authentication. Following the authentication, the first node may then log the proof of authentication to the blockchain (and transmit the proof to the other proxy network nodes for logging), determine that the RK for the target payment gateway is found within the whitelist of RKs in the authorization capsule, and re-encrypt the CT within the authorization capsule by using the RK associated with the target payment gateway. Based on the interaction identifier, the first node routes to the target payment gateway (e.g., also may be known as the "second node") the re-encrypted CT (i.e., CT') and the interaction identifier. Eighth, the target payment gateway decrypts CT' using the target payment gateway's secret key to output the plaintext credentials. Ninth, based on the interaction identifier and the plaintext credentials, the second node transmits a pre-authorization request message to the authorizing entity (e.g., via an intermediate payment network), and receives a pre-authorization response that includes a pre-authorization approval indicator (PAAI) (e.g., which may be a proof of pre-approval or denial). Tenth, upon receipt of the pre-authorization response by the target payment gateway, the target payment gateway logs the response to the blockchain (and transmits the response to the other proxy network nodes for logging to each node's respective blockchain), and transmits the pre-authorization approval indicator to the user device. Upon receiving the pre-authorization approval indicator, the merchant website may display a confirmation that the pre-authorization has been approved and that the order has been placed for future delivery by a delivery agent of the merchant. The user device may also save the pre-authorization approval indicator for future reference upon delivery.

In the third phase (e.g., a delivery and authorization phase) that follows the pre-authorization phase, and continuing with the example above, the delivery agent delivers the goods to the user, whereupon the user verifies the goods are in acceptable condition, and requests authorization from the authorizing entity. In a first step of the third phase, the delivery agent delivers goods to the user. Prior to the delivery, the agent device may have received information about the transaction (e.g., transaction amount, cart information) from the merchant server. Upon delivery, the user device launches the mobile banking application on the user's device that was initially used in phase two to submit the initial authorization request message, and the mobile banking application in turn displays a QR code on the user device. The QR code may be associated with the order that was previously placed in phase two (e.g., via transaction information such as the pre-authorization approval indicator that was previously stored on the user device). The delivery agent device then scans the QR code being displayed, which causes the mobile banking application on the user device to prompt the user for a signature (e.g., digital signature). In some cases, prior to receiving the user signature, if the goods were partially damaged in transit, the delivery agent has the option of reducing the original price to a new price that is agreed upon between the user and the delivery agent. Second, the user device receives a digital signature from the user to proceed with authorizing the payment. Third, the agent device receives from the user device an authorization request message including the user's digital signature, the pre-authorization approval indicator, and the authorization capsule (or authorization capsule identifier) associated with the mobile banking application. Fourth, the agent device processes the authorization request message received from the user device and transmits to the proxy network a subsequent authorization request message, based on the information received from the user device, the agent's digital signature, and other transaction information (e.g., previously received by the agent device from the merchant server). Fifth, a third node of the proxy network (which may be the same or different node than the first node in the second phase) receives the subsequent authorization request message from the agent device and performs several operations, similar to the operations performed in the seventh step of phase two by the first node. Upon completing those operations, the third node routes the re-encrypted credentials (CT') along with an interaction identifier to the second node (e.g., target payment gateway). Sixth, and similar to the eighth step of phase two, the second node decrypts CT' using the second node's secret key to output the plaintext credentials. Seventh, based on the interaction identifier and the plaintext credentials, the second node transmits an authorization request message to the authorizing entity (e.g., via an intermediate payment network), and receives an authorization response. Eighth, upon receiving the authorization response, the target payment gateway transmits the authorization response to the agent device and/or the user device to confirm that the payment has been approved or denied.

Embodiments improve upon conventional systems and offer several technical advantages. First, embodiments provide a method for a user to execute a transaction with a merchant without revealing user personal information (e.g., user credentials such as PII/PAN data) to untrusted parties (e.g., the merchant, delivery agent, intermediary proxy nodes (e.g., first, third nodes)). For example, one aspect of the transaction flow (e.g., using the example above, steps one through six of the second phase, and steps one through three of the third phase) is that the user does not need to reveal their credentials directly to the merchant or delivery agent. Instead, as explained above, the user obtains an interaction identifier corresponding to their order, and proceeds to obtain pre-authorization for the transaction via the proxy network based on the interaction identifier. Another technical advantage is that the user may use a wider range of applications to execute a transaction (e.g., including applications that the user may not trust with payment credentials, shopping cart information, etc.). This is enabled in part because the authorization capsule and user data may be encrypted using a cryptographic key only known by nodes of the proxy network.

Another technical advantage relates to reducing infrastructure complexity while also maintaining user privacy. For example, in contrast to solutions that may require an online component where each payment gateway contacts a bank server to decrypt encrypted payment credentials per transaction (increasing infrastructure costs), the present disclosure utilizes re-encryption keys to decrease infrastructure complexity. For example, when the user device transmits the encrypted credentials to the proxy network (e.g., step six of the second phase), any intermediary node (e.g., the first node in phase two, step seven, and the third node in phase three, step five) that receives the encrypted credentials is able to re-encrypt the encrypted credentials without first contacting a separate bank server online to decrypt the credentials to plaintext form. This may reduce the total number of messages transmitted online that are needed to decrypt the credentials to plaintext form by at least two (i.e., transmitting a decryption request message to a bank server, and receiving the decrypted credentials from the bank server). When taking into account multiple payment gateway-to-bank server integrations, a large number of user transactions occurring per integration, and the per-transaction data transfer required in an online call to a bank server, reducing the total number of messages occurring per transaction by even a small number can produce substantial overall efficiency gains. In addition, the present disclosure avoids the infrastructure complexity of multiple payment gateway-to-bank server integrations. Moreover, in embodiments, the bank does not need to share its secret key with any of the intermediaries (e.g., first node, third node), nor the target payment gateway (e.g., second node), in order to enable the target payment gateway to decrypt the re-encrypted credentials.

Additionally, as mentioned above, while a single proxy solution reduces the infrastructure complexity of maintaining an online component that integrates multiple payment gateways and bank servers to decrypt payment credentials, it also presents challenges (e.g., allowing the single proxy to accumulate user personal information, and increasing the risk of becoming a single point of failure). However, in an improvement over single proxy solutions (e.g., whereby the single proxy may typically handle user authentication and re-encryption of payment credentials), the present disclosure describes a decentralized blockchain-enabled proxy network of nodes which ensures that no single node accumulates user private information (e.g., shopping patterns) across multiple payment gateways. Moreover, because the authentication process (e.g., phase two, step seven) occurs within a trusted execution environment of a node, the user's personal information is not exposed to potentially compromised nodes of the proxy network during authentication. Furthermore, any tampering (e.g., deleting an entry in a blockchain log in a node's storage outside the trusted execution environment) that may occur by the operating system (OS) of a compromised proxy network node would be easily detected by other nodes that participate in maintaining the blockchain ledger. Thus, utilizing a decentralized proxy network to process transactions in this way helps to improve transaction integrity while maintaining user privacy. It also helps to reduce infrastructure complexity while avoiding the risks of having a single proxy node become a single point of failure (i.e. ensuring system availability to process transaction). Furthermore, the present disclosure offers a unique combination of elements within the context of a payment on delivery type of transaction (e.g., utilizing a decentralized proxy network of nodes maintaining a blockchain, each node being equipped to perform re-encryption of encrypted credentials on behalf of another node in the proxy network, and performing authentication using risk policies of an authorization capsule within a trusted execution environment).

Yet another technical advantage relates to reducing the transaction risks and complexity associated with a payment on delivery type of transaction. For example, the single payment on delivery application installed on the agent device may be configured to receive a wide variety of digital payment types (e.g., digital wallet, credit card, cryptocurrency, etc.). Meanwhile, each node of the decentralized proxy network is configured to route and process transactions to the appropriate target payment gateway according an interaction identifier with a standardized format used by the proxy network. Therefore, the delivery agent no longer needs to maintain multiple payment applications on the agent device whereby each application handles a different payment mechanism, which is prone to handling error and is time consuming. Another technical advantage is that, even if the user may later (e.g., mistakenly) believe that the goods were not delivered/received, the logging mechanism of the proxy network provides the user and merchant with more robust transaction history information to reduce cases of unintended transaction disputes. Finally, another technical advantage is that the infrastructure upgrade steps that a merchant performs to enable payment on delivery transactions (e.g., on the merchant website) is minimal, thus reducing the barrier to adoption. Specifically, the merchant may simply download and install a hot module replacement (e.g., JavaScript update) that enables the merchant server to process payment on delivery transactions via the proxy network.

Prior to discussing the details of some embodiments of the present disclosure, description of some terms may be helpful in understanding the various embodiments.

A "user device" (e.g., a mobile communication device or a mobile device used by a user) may comprise any suitable electronic device that may be transported and operated by a user. It may also provide remote communication capabilities to a network. A user device may include a display, a memory, a processor, a computer-readable medium, and any other suitable component. A user device may communicate using a mobile phone (wireless) network, wireless data network (e.g. 3G, 4G or similar networks), Wi-Fi, Bluetooth, Bluetooth Low Energy (BLE), Wi-Max, or any other communication medium that may provide access to a network such as the Internet or a private network. Examples of user devices include mobile phones (e.g. cellular phones), PDAs, tablet computers, net books, laptop computers, wearable devices (e.g., watches), vehicles such as automobiles and motorcycles, personal music players, hand-held specialized readers, etc. A user device may comprise any suitable hardware and software for performing such functions, and may also include multiple devices or components (e.g. when a device has remote access to a network by tethering to another device—i.e. using the other device as a modem—both devices taken together may be considered a single mobile device).

A "contactless" communication may be a communication in which data is exchanged between two devices without the need for the devices to be physically coupled. Without limiting the generality of the foregoing, "contactless" communication can include data transmissions by near-field communication (NFC) transceiver, machine readable codes such as QR codes, laser, radio frequency, infrared communications, or other radio frequency or wireless communication protocols such as Bluetooth, Bluetooth low-energy (BLE), Wi-Fi, iBeacon, etc.

An "access device" may be any suitable device for providing access to something. An access device may be in any suitable form. Some examples of access devices include point of sale (POS) devices, cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, websites, and the like. An access device may use any suitable contact or contactless mode of operation to send or receive data from, or associated with, a user device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a user device.

A "resource provider" can be an entity that provides resources (e.g., goods, services, access to secure data, access to locations, or the like) during a transaction. For example, a resource providing entity can be a merchant, a venue operator, a building owner, a governmental entity, etc. A "merchant" may typically be an entity that engages in transactions and can sell goods or services, or provide access to goods or services.

"Authentication data" may include any data suitable for authenticating an entity. Authentication data may be obtained from a user or a device that is operated by the user. Examples of authentication data obtained from a user may include PINs (personal identification numbers), biometric data, passwords, etc. Examples of authentication data that may be obtained from a device may be include device serial numbers, hardware secure element identifiers, device fingerprints, phone numbers, IMEI numbers, etc. Authentication data may also include other user metadata, including behavioral attributes (e.g., frequency of user purchases, typical transaction amounts, etc.).

"Access data" may include any suitable data that can be used to access (or obtain) a resource or create data that can access a resource. In some embodiments, access data may be account information for a payment account. Account information may include a PAN, payment token, expiration date, verification values (e.g., CVV, CVV2, dCVV, dCVV2), etc. In some embodiments, access data may be stored on a user device (e.g., either in plaintext form or encrypted using a cryptographic key) for later use to obtain the resource. In an example where access data is used in a payment on delivery type of transaction, the access data may be used more than once to obtain a resource (e.g., obtaining pre-authorization, and then later obtaining authorization upon delivery of the goods).

An "access request" may include a request for access to a resource. The resource may be a physical resource (e.g., good), digital resources (e.g., electronic document, electronic data, etc.), or services. Typically, in a payment on delivery transaction, the resource may be a physical resource that is delivered by an agent of the resource provider. In some cases, an access request may be submitted by transmission of an access request message that includes access request data. Typically a device associated with a requestor may transmit the access request message to a device associated with a resource provider.

"Access request data" may include any information surrounding or related to an access request. Access request data may include access data. Access request data may include information useful for processing and/or verifying the access request. For example, access request data may include details associated with entities (e.g., resource provider computer, processing server computer, authorization computer, etc.) involved in processing the access request, such as entity identifiers (e.g., name, etc.), location information associated with the entities, and information indicating the type of entity (e.g., category code). Exemplary access request data may include information indicating an access request amount, an access request location, resources received (e.g., products, documents, etc.), information about the resources received (e.g., size, amount, type, etc.), resource providing entity data (e.g., resource provider data, document owner data, etc.), user data (e.g., user credentials), date and time of an access request, a method utilized for conducting the access request (e.g., contact, contactless, etc.), and other relevant information.

A "credential" may be any suitable information that serves as reliable evidence of worth, ownership, identity, or authority. A credential may be a string of numbers, letters, or any other suitable characters, as well as any object or document that can serve as confirmation. Examples of credentials include value credentials, identification cards, certified documents, access cards, passcodes and other login information, etc. Other examples of credentials include PANs (primary account numbers), PII (personal identifiable information) such as name, address, and phone number, and the like.

An "authorizing entity" may be an entity that authorizes a request, typically using an authorizing computer to do so. An authorizing entity may be an issuer, a governmental agency, a document repository, an access administrator, etc. An "issuer" may typically include a business entity (e.g., a bank) that maintains an account for a user. An issuer may also issue payment credentials stored on a user device, such as a cellular telephone, smart card, tablet, or laptop to the user.

A "payment gateway" (PG) can include one or more computers that can serve as a front end to a payment transaction. In some cases, a payment gateway can obtain information (e.g., credentials, amounts, and other information) from a merchant to process and transmit to a downstream entity such as an acquirer, payment processor, or issuer. In some cases, a payment gateway can be an intermediary entity within a payment processing network that facilitates a payment transaction by the transfer of information between a payment portal (e.g., website, mobile phone) and an authorizing entity. The payment gateway typically provides a resource provider service that authorizes credit card or direct payments processing for resource providers. Accordingly, a resource provider (e.g., merchant) may be associated with a particular payment gateway, and the particular payment gateway may be affiliated with one or more authorizing entities.

An "authorization request message" can be a message that requests authorization for a transaction. In some cases, an authorization request message may be an electronic message that is sent to a payment processing network (e.g., payment gateway) and/or an issuer of a payment card to request authorization for a transaction. An authorization request message may comply with ISO 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), an expiration date, etc.

An "authorization response message" may be an electronic message reply to an authorization request message. In some cases, an authorization response message is generated by an issuing financial institution or a payment processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant's access device (e.g., POS equipment) and/or user device that indicates approval of the transaction. The code may serve as proof of authorization.

A "server computer" is typically a powerful computer or cluster of computers. For example, the server computer can be a large mainframe, a minicomputer cluster, or a group of servers functioning as a unit. In one example, the server computer may be a database server coupled to a Web server.

A "processor" may include any suitable data computation device or devices. A processor may comprise one or more microprocessors working together to accomplish a desired function. The processor may include CPU comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "trusted execution environment" (TEE) can be a secure area (e.g., reserved memory) within a computing environment. Specifically, a trusted execution environment provides an isolated execution environment (e.g., running in parallel with the OS executing in the computing environment) which ensures the integrity of applications executing within the trusted execution environment, along with the confidentiality of data that is processed within the trusted execution environment. In other words, the OS and/or untrusted applications not executing within the trusted execution environment cannot tamper with code that is executing with the trusted execution environment.

An "application" may be a computer program that is used for a specific purpose. Examples of applications may include banking applications, digital wallet applications, loyalty rewards applications, etc. In some embodiments, an application may be associated with an account of the user maintained by a resource or service provider (e.g., a bank account, a loyalty rewards account).

An "interaction identifier" may be a sequence of characters that are used to identify a unique interaction between entities. In an example, an interaction may be between a user (e.g., consumer) and a resource provider (e.g., merchant), for example, involving a purchase of goods. The interaction may also involve other intermediary entities (e.g., a payment gateway, authorizing entity) that may utilize the interaction identifier to identify the interaction. The interaction identifier may include characters such as letters, digits, symbols, etc. To identify a unique interaction, the interaction identifier may utilize a dynamic data element (e.g., changing with each interaction). For example, it may involve a randomly generated number (e.g., cryptographic Nonce), time of day, or any suitable form. The interaction identifier may also include (e.g., concatenate) other information in addition to a dynamic data element, for example, including information used to route the interaction identifier to a particular destination, or determine other interaction processing steps.

"Interaction data" may be data that is associated with a particular interaction. This may include, by way of example only, transaction information related to consumer's purchase order, such as cart information, transaction amount, and/or merchant information. It may also include information related to intermediaries (e.g., merchant's delivery agent) involved in processing the interaction, etc.

An "authorization capsule" may be a container for data and/or code which may be used to process an interaction. The authorization capsule may be encrypted or signed using a cryptographic key (e.g., encrypted with a public key of a public/secret key pairing that is shared by multiple entities). The authorization capsule may utilize any suitable data structure or combination of data structures (e.g., data arrays, strings, tables, etc.). Data within the authorization capsule may be used to perform authentication for a particular interaction (e.g., purchase of goods between a user and a merchant). For example, data components included within the authorization capsule may include payment credentials such as PII/PAN data, routing information, cryptographic keys to be used in processing data pertaining to the interaction, policy data used to perform authentication of an interaction, etc. Each data component within the authorization capsule may be encrypted or in plaintext format. The code within the authorization capsule may be software containing instructions executable by a processor. In some examples, the code may be used to perform operations on one or more of the data components of the authorization capsule. Code within the authorization capsule may also be used to define (e.g., by defining a start point and an end point within the code) portions of code and/or data within the authorization capsule that may only be accessed within a trusted execution environment. By way of example only, the authorization capsule may define a portion of code that corresponds with policy enforcement functions of an authorizing entity, which is executed only within a trusted execution environment.

A "reception node" may be a computing device (e.g., a server computer) that is configured to receive and process messages corresponding to requests to initiate an interaction. In one example, a reception node may be a node that is connected to a network of other nodes. In this example, one or more nodes of the network may be configured to operate as a reception node. A node that is configured to operate as a reception node may also be configured to perform other functions as well (e.g., performing authentication for an interaction). A reception node may receive information related to an interaction (e.g., interaction data such as a transaction amount, cart information, merchant information, payment gateway information), and generate an interaction identifier that corresponds to the interaction. In a case where a reception node exists within a network of nodes, the reception node may also be responsible for transmitting messages to other nodes of the network, such that another node of the network, upon receiving a message containing an interaction identifier, may properly process the message. This processing may involve, for example, associating the interaction identifier with a particular interaction and/or generating and routing a subsequent message to an appropriate destination (e.g., another node in the network, or an authorizing entity).

A "routing message" may be a message that is sent by a node of a network of nodes to another node within the network. The routing message may include information used to process an interaction, including interaction data, an interaction identifier, user credentials, or other suitable information. The node that transmits the routing message may first receive a message (e.g., authorization request message for an interaction) from an external entity to the network of nodes (e.g., a user device). Based on information (e.g., an interaction identifier) within the first message from the external entity, the node may determine which node in the network should be the target destination for the routing message. In some examples, the node may further process the message before transmitting a routing message to the target destination node.

Details of some embodiments of the present disclosure will now be described in greater detail. For clarity, a certain number of components are shown in the subsequent figures. It is understood, however, that embodiments of the disclosure may include more than one of each component. In addition, the components in each figure may communicate via any suitable communication medium (including the internet), using any suitable communication protocol.

FIG. 1 shows a flow diagram 100 depicting a message exchange process involving the deployment and usage of RKs to obtain a resource from a resource provider, according to an embodiment. In particular, FIG. 1 steps S110-S122 depict an aspect of the first (i.e., deployment) phase described above, whereby an RK is created by an authorizing entity (AE) 105, the RK being associated with a particular node in a proxy network 101 (e.g., second node 104), and the authorizing entity 105 publishes the RK to the proxy network 101. Subsequently, the authorizing entity 105 provisions a user device 102 with a plurality of RKs that were previously generated by authorizing entity 105. Steps S124-S138 further depict the process by which RKs are used during the second (i.e., pre-authorization) and/or third (i.e., authorization) phases.

At step S110, an authorizing entity 105 (e.g., issuer such as a bank) generates a cryptographic key pair (e.g., public key and a secret key) according to a particular proxy re-encryption (PRE) scheme. It should be understood that, although a particular proxy re-encryption scheme (i.e., Ateniese, Fu, Green, and Hohenberger, 2005 ("AFGH")) will be discussed in the steps below, other proxy re-encryption schemes are well-known, and any suitable proxy re-encryption scheme may be used to enable the embodiments presently disclosed. (For more details on AFGH, see G. Ateniese, K. Fu, M. Green, and S. Hohenberger. Improved Proxy Re-encryption Schemes with Applications to Secure Distributed Storage. In NDSS, pages 29-43, 2005.) As a non-limiting example of another suitable proxy re-encryption scheme, the Blaze, Bleumer, and Strauss, 1998 ("BBS") scheme may also be used to enable the present disclosure. (For more details on BBS, see M. Blaze, G. Bleumer, and M. Strauss. Divertible Protocols and Atomic Proxy Cryptography. In EUROCRYPT '98, volume 1403 of LNCS, pages 127-144, 1998.) Turning to the utilization of the AFGH proxy re-encryption scheme in more detail, the scheme requires random generators $g \in G_1$ and $Z=e(g, g) \in G_2$ (where $G_1$, $G_2$ are two groups of prime order q with a bilinear mapping e: $G_1 \times G_2 \rightarrow G_2$). Accordingly, the public key ($PK_{AE}$) and secret key ($SK_{AE}$) for the authorizing entity 105 may be represented, respectively, as a pair: ($PK_{AE}$, $SK_{AE}$)=($g^a$, a), where a is randomly selected within $\mathbb{Z}^* \, \mathbb{Z}'_q$.

At step S112, a second node 104 in a proxy network 101 of nodes generates a pair of cryptographic keys (e.g., public key and a secret key) according to the particular proxy re-encryption (PRE) scheme of step S110. It should be understood that step S112 may precede step S110 in some embodiments. In some embodiments, the second node 104 may be a computer (or computer server) corresponding to an intermediary service in a payment processing network, such as a payment gateway. The second node 104 may have a relationship with one or more merchants (not shown in FIG. 1) to provide the service. Furthermore, in some embodiments, the second node 104 may be affiliated with a particular issuer 105 (e.g., approved to authenticate transactions on behalf of the issuer). For example, the issuer may provide the payment gateway 104 as a service to its customers. In other cases, the payment gateway 104 may be provided by a separate third-party service provider, but have an affiliation with the issuer 105. (FIG. 3 below discusses further details regarding nodes (e.g., first node 103, second node 104) of the proxy network 101.) Returning to step S112, and continuing with the AFGH re-encryption scheme introduced above, the second node (N2) 104 generates a public key ($PK_{N2}$) and secret key ($SK_{N2}$) which may be represented, respectively, as a pair: ($PK_{N2}$, $SK_{N2}$)=($g^b$, b), where b is randomly selected within $\mathbb{Z}^* \, *_q$.

At step S114, the second node 104 publishes the public key ($PK_{N2}$) to the proxy network 101 such that the authorizing entity 105 is able to fetch the public key ($PK_{N2}$). In some embodiments, the authorizing entity 105 is communicably connected with the proxy network 101 such that the authorizing entity 105 is able to fetch a public key ($PK_{N2}$) that is published by a proxy network node 104. In an example, the proxy network 101 may operate a node that serves as a key mediary (not shown). When a node (e.g., second node 104) of the proxy network transmits the public key ($PK_{N2}$) to the mediary, the mediary in turn transmits a notification that a new public key ($PK_{N2}$) is available to authorizing entities who have registered with the mediary. It should be understood that the public key ($PK_{N2}$) may be published to an authorizing entity 105 using any suitable mechanism.

At step S116, the authorizing entity 105 generates a re-encryption key ($RK_{AE \rightarrow N2}$) in accordance with the properties of particular proxy re-encryption scheme. The $RK_{AE \rightarrow N2}$ is utilized by an algorithm of the proxy re-encryption scheme to translate an encrypted message (e.g., payment credentials) that was encrypted under the public key of one entity (e.g., $PK_{AE}$ of authorizing entity 105) into an encrypted message that is encrypted under the public key of another entity (e.g., $PK_{N2}$ of second node 104). In this way, the second node 104 is able to decrypt the contents of the encrypted message without knowing the secret key of the authorizing entity 105. Continuing with the AFGH scheme example, the authorizing entity 105 may generate an $RK_{AE \rightarrow N2}$ by using the pair ($SK_{AE}$, $PK_{N2}$) as input to a proxy re-encryption RK generation function, which outputs the $RK_{AE \rightarrow N2}$. For example, $RK_{AE \rightarrow N2}$ may be computed as follows: $RK_{AE \rightarrow N2} = (g^b)^{1/a} = g^{b/a}$. It should be understood that in some embodiments, for example using a different PRE scheme, a RK may be generated using different inputs.

For example, under the BBS PRE scheme, the RK may be generated using the secret key ($SK_{N2}$) of the second node 104. In that case, the second node 104 may need to previously have shared the $SK_{N2}$ with authorizing entity 105. In either case, $RK_{AE \rightarrow N2}$ may be derived from a private key of authorizing entity 105 and a cryptographic key (e.g., public key ($PK_{N2}$) under AFGH scheme, private key ($SK_{N2}$) under BBS scheme) of the second node 104.

At step S118, authorizing entity 105 may publish $RK_{AE \rightarrow N2}$ to the proxy network 101. For example, the authorizing entity 105 may transmit $RK_{AE \rightarrow N2}$ to a key mediary node (described above, not shown) for storage. In some embodiments, the authorizing entity 105 may dedicate a local server for storing RKs generated by the authorizing entity 105 to be retrieved and used for later provisioning to a user device (e.g., step S122). Any suitable storage mechanism may be used to perform embodiments of the present disclosure.

At step S120, the authorizing entity 105 may encrypt a plaintext message (m), which may represent plaintext credentials of a user (e.g., PII/PAN data), using the public key of the authorizing entity 105 ($PK_{AE}$). In some embodiments, prior to performing step 120 (not shown), the user may have downloaded and installed an application (e.g., mobile banking application of the authorizing entity 105) onto the user device 102. As part of the application setup process, the user may input personal information that corresponds to the user's account with the authorizing entity 105, and transmit that information to the authorizing entity 105 in order to provision the user device 102 with access data that can be later used to conduct a transaction using the user device 105. Upon transmitting that personal information to the authorizing entity 105, the authorizing entity 105 may retrieve the user's credentials corresponding to the user's account, and then, in step S120, encrypt the user's credentials into a ciphertext (CT). Continuing with the AFGH scheme as an example, the ciphertext may be represented as a pair:

$$CT = (Z^{r*}m, g^{ra}),$$

where $m \in G_2$, and r is a random number in $\mathbb{Z}^* \, *_q$.

At step S122, the authorizing entity 105 may transmit the CT and a whitelist of RKs (e.g., including $RK_{AE \rightarrow N2}$, etc.) to the user device 102 as part of the provisioning process (e.g., which the user may have initiated during setup of the mobile banking application, discussed above). More specifically, the authorizing entity 105 may cause an authorization capsule (AC), discussed further below in reference to FIG. 2, to be provisioned on the user device 102. In an example, authorizing entity 105 may first fetch the RKs from a key mediary of the proxy network that stores RKs published by authorizing entity 105 (e.g., step S118). Next, authorizing entity 105 may include the fetched RKs into a whitelist of RKs (the whitelist being a component of the authorization capsule), whereby each RK in the whitelist may respectively correspond to a node in proxy network 101 which is associated (e.g., affiliated) with authorizing entity 105. In an example and only for illustration purposes, the authorizing entity 105 may be permitted to conduct transactions with users and merchants in Japan and the United States (U.S.), but not South Korea. Accordingly, the authorizing entity 105 may be affiliated with payment gateway's operating in Japan and the U.S., but not be affiliated with payment gateways operating in South Korea. Accordingly, in provisioning the whitelist of RKs within the authorization capsule to the user device 102, the authorizing entity 105 may include only RKs corresponding to nodes of the payment gateways in the U.S. and Japan for which the authorizing entity 105 previously generated RKs. In another example, the authorizing entity 105 may be affiliated with a payment gateway that processes transactions using cryptocurrencies, while another payment gateway may process transactions involving credit cards. The authorizing entity 105 may be affiliated with both of the payment gateways, to support a wider range of transaction payments, and thus RKs corresponding to both payment gateways' nodes (e.g., $RK_{AE \to N1}$, $RK_{AE \to N2}$) may be included within the whitelist. As mentioned above, in addition to the whitelist of RKs, the authorizing entity 105 may also provision within the authorization capsule the CT that was previously generated in step S120. The authorization capsule may then be stored on the user device 102 for later use to conduct a transaction.

After step S122 has been completed, it should be understood that, at this point in the flow diagram 100 of FIG. 1, the first phase (i.e. deployment phase) is completed. Specifically, each authorizing entity 105 may have generated and published one or more RKs to the proxy network 101 (e.g., step S116, S118), each RK being generated based on a secret key of the authorizing entity 105 (e.g., $SK_{AE}$) and a cryptographic key (e.g., $PK_{N2}$) that was published by a node (e.g., second node 104) in the proxy network 101. Furthermore, the user device 102 has been provisioned with the authorization capsule containing both a whitelist of RKs and encrypted credentials (CT). In the subsequent steps S124-S138 described below, the primary focus is given to how the RKs previously deployed in earlier steps will be used to conduct the transaction. It should be understood that, although steps S124-S138 described below focus on the pre-authorization phase of a payment on delivery transaction, similar steps may be taken during the subsequent authorization phase upon delivery of a resource to the user (as described further below in reference to FIGS. 5 and 6).

At step S124, the user device 102 initiates a request for pre-authorization from the authorizing entity 105 in a payment on delivery transaction by sending an initial authorization request message to a first node 103 in the proxy network 101. The initial authorization request message contains an interaction identifier (which may identify the second node 104 that is associated with the merchant involved in the transaction), the authorization capsule that was provisioned onto the user device in step S122, and other user data (e.g., user behavioral metadata). It should be understood that the first node 103 may represent any node of the proxy network 101. In other words, any node that has joined the proxy network 101 may be configured to receive and process the initial authorization request message sent from a user device 102, as explained further below.

At step S126, the first node 103 performs authentication by using risk policies in the authorization capsule and user data that were both sent within the initial authorization request message (discussed further below in reference to FIG. 2).

At step S128, upon confirmation that the authentication in step S126 was successful, the first node 103 may re-encrypt the CT by using the $RK_{AE \to N2}$. As a preliminary step, the first node 103 may first determine if the RK for the second node 104 is found within the whitelist of RKs included in the authorization capsule. For example, the merchant conducting the transaction may be associated with a South Korean payment gateway (e.g., operating as the second node 104) that has joined the proxy network 101. Upon receiving the initial authorization request message, even if the authentication performed in step S126 may be successful, the first node may determine that the whitelist does not contain a $RK_{AE \to N2}$ corresponding to the authorizing entity 105 and the second node 104. In this example, the first node 103 may then terminate the transaction through any suitable mechanism (e.g., returning a failure message to the user device). However, in another example (e.g., the second node 104 is operating in Japan and affiliated with the authorizing entity 105), upon determining that the $RK_{AE \to N2}$ is found in the whitelist, the first node 103 may perform re-encryption by using the $RK_{AE \to N2}$. Continuing with the AFGH proxy re-encryption scheme introduced above, the re-encryption algorithm may produce a new CT (i.e. CT') as output, and may be represented by the following equation as a pair:

$$CT' = (Z^{r*}m, e(g^{ra}, RK_{AE \to N2})) = (Z^{r*}m, e(g^{ra}, g^{b/a})) = (Z^{r*}m, Z^{rb});$$

At step S130, the first node 103 transmits a routing message including CT' and the interaction identifier to the second node 104, based in part on the routing information included within the interaction identifier (e.g., identifying the second node 104 as the target payment gateway).

At step S132, upon receiving the CT' and the interaction identifier from the first node 103, the second node 104 may decrypt the CT' by using the secret key ($SK_{N2}$) of the second node 104 to output the original message (m) (e.g., plaintext credentials). Continuing with the AFGH proxy re-encryption scheme introduced above, the decryption algorithm may decrypt the CT' as depicted in the following representation:

$$m = (Z^{r*}m)/(Z^{rb})^{1/b};$$

As mentioned above, it should be understood that a technical advantage of the present disclosure is that the second node 104 does not need to first obtain the secret key ($SK_{AE}$) of the authorizing entity in order to decrypt CT' to obtain m. The facilitates a process by which the encrypted personal information is hidden from intermediaries (e.g., the merchant, delivery agent, first node 103), while still allowing the second node 104 to decrypt the encrypted credentials. This obviates the need for complex infrastructure to enable online calls to a bank server to decrypt the encrypted credentials.

At step S134, the second node 104 may transmit a pre-authorization request message containing the payment credentials (e.g., PII/PAN data) and other transaction information (e.g., derived from the interaction identifier) to the authorizing entity 105. The pre-authorization request message can take the form of an authorization request message, but is an initial authorization request prior to a subsequent authorization request.

At step S136, the authorizing entity 105 processes the pre-authorization request message and transmits a pre-authorization response message to the second node 104 (e.g., containing a pre-authorization approval indicator (PAAI) corresponding to proof of pre-authorization approval or denial).

At step S138, the second node 104 forwards the pre-authorization response message to the user device 102 and to the merchant website (not shown). As mentioned above, it should be understood that, although steps S124-S138 were described in reference to the pre-authorization process of a payment on delivery transaction, similar steps may be taken during the subsequent authorization process upon delivery of a resource to the user (as described further below in reference to FIGS. 5 and 6). Further details regarding system components and/or operations (e.g., authentication process) described above are further explained in reference to subsequent figures.

Figure 2:
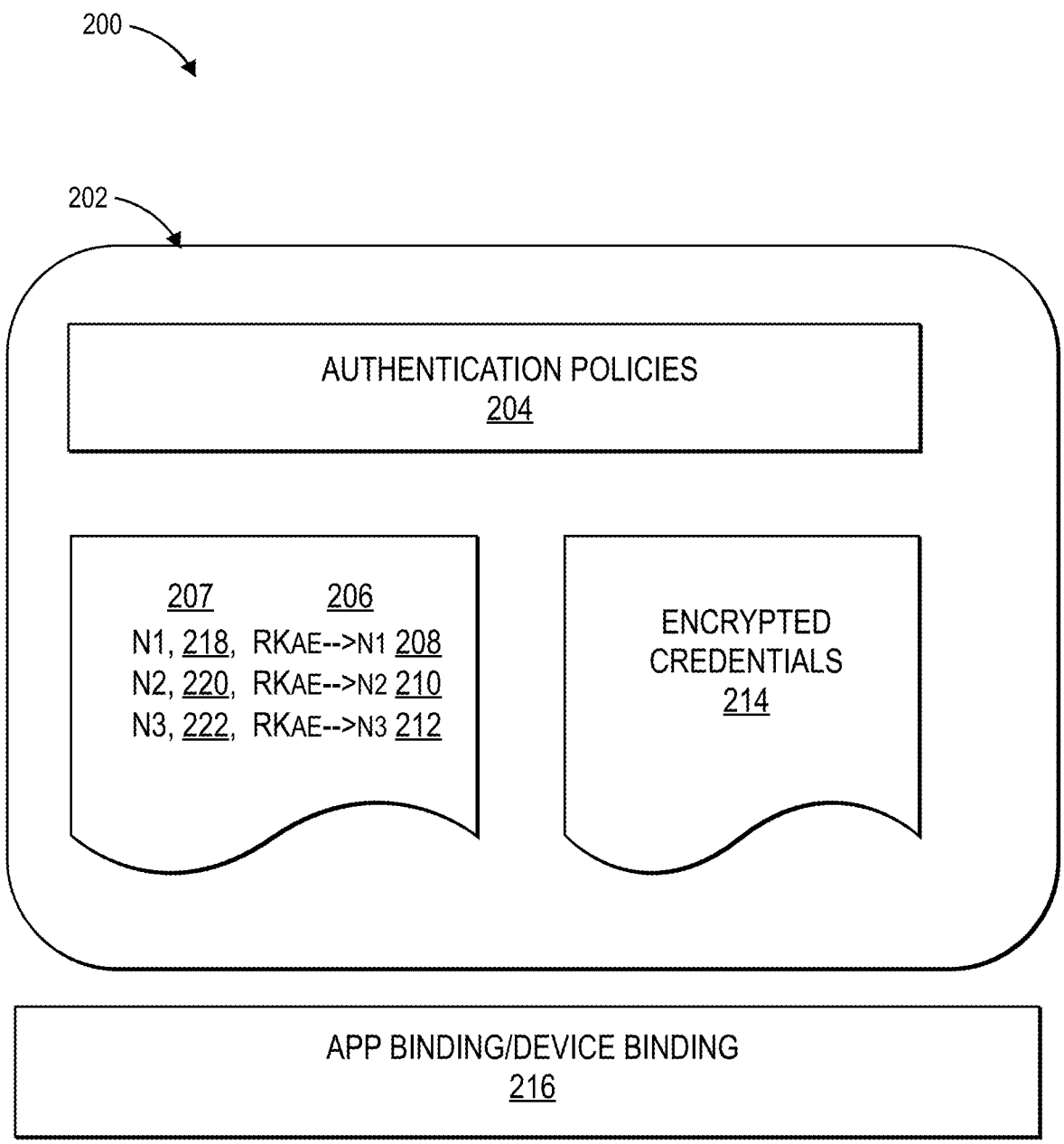
FIG. 2 shows a diagram depicting an exemplary authorization capsule that may be provisioned onto a user device, according to an embodiment.

FIG. 2 shows a block diagram 200 depicting an authorization capsule (AC) that may be provisioned onto a user device 102, according to an embodiment. In FIG. 2, AC 202 includes four components: authentication policies 204, a white list of RKs 206, a list of node identifiers 207 (each node identifier respectively associated with an RK of the whitelist 206), and encrypted credentials 214. The authorization capsule 202 itself may be architected as a form of data container, which may correspond to any suitable data structure (e.g., one or more arrays or tables for each component of authorization capsule 202). In some embodiments, the authorization capsule 202 may correspond to an application that contains instructions (e.g., code) and data, whereby the code may be executed by a processor (e.g., of a proxy network node) to perform operations involving one or more of the components 204, 206, 207, 214. In some embodiments, the authorization capsule 202 may include code that defines both trusted and untrusted portions of data and/or code within the application. As an example, the trusted portion may define private regions of code and data (e.g., "enclaves") whose contents are protected and unable to be either read or saved by any process outside the enclave itself and may be executed and/or accessed only within a trusted execution environment (discussed further below in reference to the trusted execution environment of a proxy network node in FIG. 3). For example, the authorization capsule 202 may include a module that performs user authentication based on user metadata and using the authentication policies 204 of an authorizing entity 105. The authorization capsule 202 authentication module may determine that this function (including the data that it operates on) may only be executed within the trusted execution environment, thus ensuring data privacy and integrity of code execution.

Furthermore, in some embodiments, the authorization capsule 202 itself may be encrypted or signed using a cryptographic key that is shared by each node of the proxy network 101. In an example, each of the nodes of the proxy network 101 may share a public/secret key pairing (which is different than the public/secret keys or RKs used in the re-encryption process described in FIG. 1). During the provisioning of the authorization capsule 202 to the user device 102 (e.g., FIG. 1, step S122), the authorizing entity 105 may encrypt the authorization capsule 202 using the public key of the proxy network. Later, when the user may transmit the authorization capsule 202 to the first node 103 (e.g., FIG. 1, step S124), the first node 103 may then decrypt the authorization capsule 202 using the secret key shared by nodes in the proxy network 101.

Turning to the components of authorization capsule 202 in further detail, authentication policies 204 may include one or more user authentication policies that were determined by the authorizing entity 105 when provisioning the authorization capsule 202 to the user device 102. These authentication policies may include policies such as dynamic user authentication (e.g., via a token, biometric ID, username/password, etc.), whitelist/blacklist of merchants (e.g., via merchant codes (MCC)), amount limit checks (e.g., setting a threshold for a maximum approved purchase price), velocity checks (e.g., setting a threshold for a maximum number of purchases within a period of time), proximity/background checks (e.g., blocking a transaction in a certain region), application/device binding verification (discussed further below), and authentication against user behavioral metrics (e.g., based on user metadata), among others. Any suitable authentication policy 204 may be used to perform embodiments of the present disclosure.

In some embodiments, the user behavioral metrics may be verified against user data (e.g., user metadata) that may be received (e.g., by the first node 103 of the proxy network 101 in FIG. 1, step S124) alongside the authorization capsule 202. In some embodiments, the user metadata may be stored on the user device 102 by a mobile banking application. By way of example only, the user metadata may include data such as average transaction price, frequency of purchases per day, types of merchants frequently purchased from, ability to pay credit statement on-time, etc. It should be understood that the user metadata may also be encrypted (e.g., using a cryptographic key shared by nodes in the proxy network 101). This key may be the same or a different cryptographic key than was used to encrypt the authorization capsule 202.

Turning to the list of RKs 206 embedded in authorization capsule 202, represented by $RK_{AE \to N1}$ 208, $RK_{AE \to N2}$ 210, and $RK_{AE \to N3}$ 212, this list may correspond to the whitelist of RKs discussed above in reference to FIG. 1, step S122. Accordingly, each of the plurality of RKs 208, 210, and 212 are respectively associated with nodes in the proxy network that are affiliated with the authorizing entity 105 (e.g., each node corresponding to a distinct payment gateway that is approved by the authorizing entity 105 as an authorized payment gateway). In some embodiments, the whitelist may be created during the provisioning of the authorization capsule 202 (e.g., FIG. 1, step S122) based on one or more RKs that were previously created by the authorizing entity 105 (e.g., performing steps S116-S118 for multiple nodes of the proxy network 101).

Additionally, the authorization capsule 202 may contain a plurality of node identifiers 207, each node identifier 207 respectively associated with an RK of the whitelist 206. Concretely, in some embodiments, an RK entry of the whitelist 206 and an entry of the list of node identifiers 207 may be paired together, for example, of the form {pg_id, pg_rk}, respectively corresponding to the particular payment gateway that the RK is associated with, and the RK itself. As an example, a first node 103 may receive an interaction identifier and authorization capsule 202 within an initial authorization request from a user device 102. The interaction identifier may be represented as a concatenation of a payment gateway node identifier (e.g., second node 104 with pg_id="N2") and a Nonce (e.g., random_nonce∥pg_id). The first node 103 may determine if the payment gateway node identifier (pg_id) within the interaction identifier matches a payment gateway node identifier of the list of node identifiers (e.g, N2 220) within the list 207. If there is a match, the first node 103 may use the associated RK in the whitelist 206 to re-encrypt the encrypted credentials 214 (e.g., $RK_{AE \to N2}$ 210).

The encrypted credentials 214, in some embodiments, may correspond to plaintext credentials that are encrypted using a public key of the authorizing entity 105. As an example, this may include PII such as user demographics and billing address, as well as PAN data. As discussed earlier in reference to FIG. 1, step S120, the plaintext credentials may be encrypted by the authorizing entity 105 and then provisioned to the user device 102 for later re-encryption (see FIG. 1, step S122, step S128).

The application binding/device binding 216, in some embodiments, may correspond to a binding of the authentication policies 204, the whitelist of RKs 206, the list of node identifiers 207, and the encrypted credentials 214 against a particular application (e.g., the mobile banking application on the user device) and/or the user device (e.g., IMEI number, SIM card, etc.) to prevent skimming attacks on the authorization capsule 202. In some embodiments, the components of the authorization capsule 202 may further be digitally signed with the authorizing entity's 105 private key.

Figure 3:
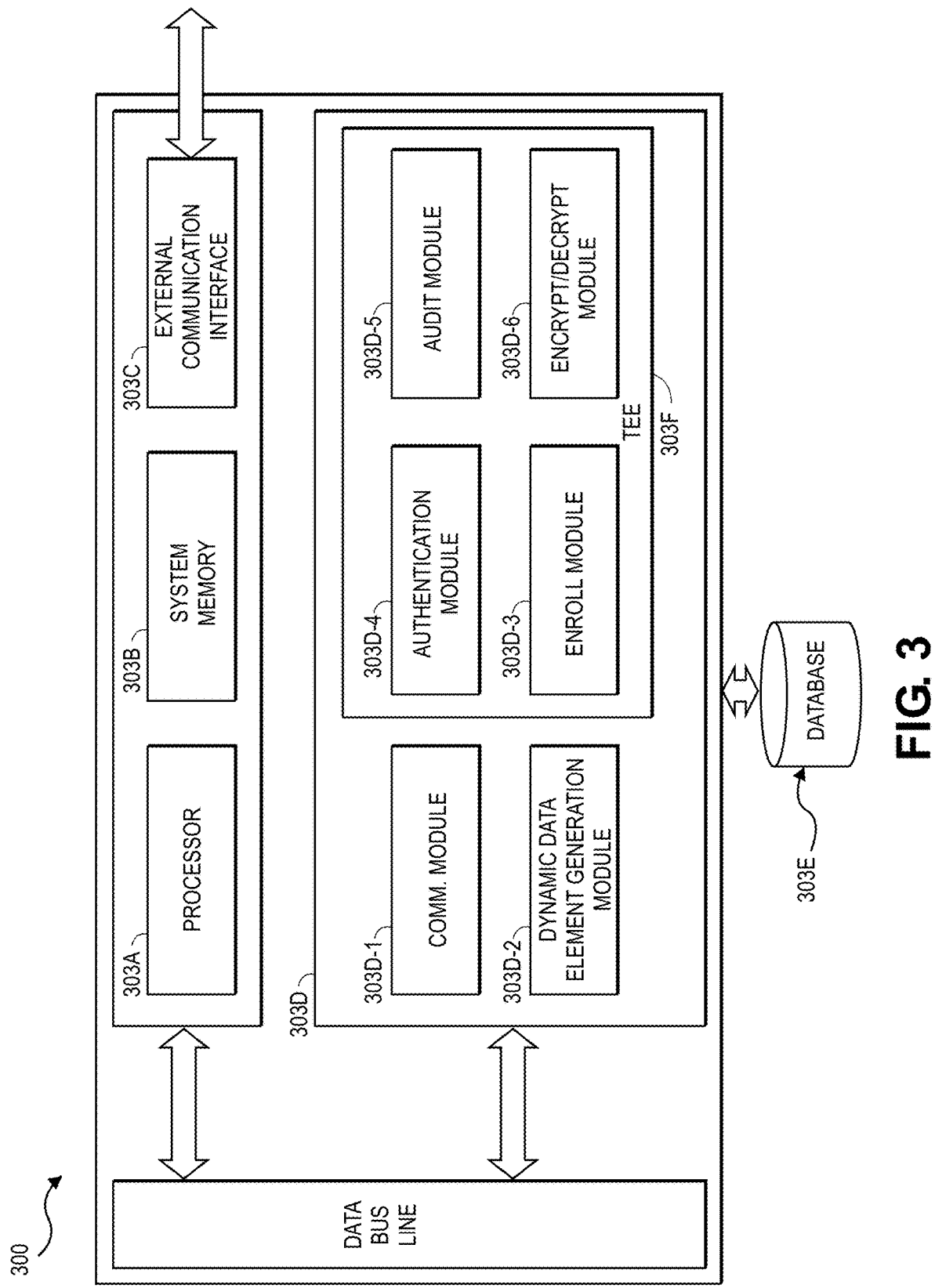
FIG. 3 shows a block diagram depicting an exemplary node of a proxy network, according to an embodiment.

FIG. 3 shows a block diagram depicting an exemplary node of a proxy network 101, according to an embodiment. The proxy node 300 depicted in FIG. 3 may be a computer that is configured to perform a variety of roles, depending on the particular context (e.g., generating a pair of cryptographic keys, processing an initial authorization request message as a reception node, performing authentication and re-encryption as a first or third node 103, or decrypting the encrypted credentials and transmitting the pre-authorization (or authorization) request to authorizing entity 105 as a second node 104). It should be understood that any node that has been provisioned to the proxy network 101 may be configured to perform these roles, whether or not the node may be affiliated with the authorizing entity 105.

The node 300 may comprise a processor 303A, which may be coupled to a system memory 303B and an external communication interface 303C. A computer readable medium 303D may also be operatively coupled to the processor 303A. A database 303E may also be in operative communication with the processor 303A. The database 303E may contain access data such as logs that have been committed to the blockchain being maintained by each node 300 of the proxy network 101. The database 303E may also contain data (e.g., an authorization capsule) that may be stored in reference to a particular transaction, and/or a history of authentication results from previous transactions (e.g., proof of authentication, discussed further below). The database 303E may also contain mappings between a particular interaction identifier and one or more data (e.g., the target payment gateway identifier, a merchant device/interface identifier, an agent device identifier, an issuer identifier, a user device identifier, the authorization capsule (or authorization capsule identifier) from a particular user device, and/or user device identifiers such as phone numbers, IP addresses, device identifiers, etc.).

The computer readable medium 303D may comprise a number of software modules, including a communication module 303D-1, a dynamic data element generation module 303D-2, and enroll module 303D-3, an authentication module 303D-4, an audit module 303D-5, and an encryption/decryption module 303D-6. The computer readable medium 303D may further include a trusted execution environment (TEE) 303F, which may execute one or more of the software modules.

The trusted execution environment 303F may be implemented using any suitable mechanism. As a non-limiting example, the Intel Software Guard Extension (SGX) solution may be used to implement a trusted execution environment according to embodiments of the present disclosure. It should be understood that, in contrast to the non-trusted execution environment portion of the computer readable medium 303D, which may be accessed by the OS or processes running within the OS, the trusted execution environment 303F is protected, as described above. Accordingly, in an example and referencing FIG. 3, a non-trusted process executing within the OS of node 300 may not read or tamper with code or data (e.g., risk policies, user data) being executed by the authentication module 303D-4 (also may be known as "authentication enclave"), which is executing within the trusted execution environment 303F. It should be understood that the modules depicted in FIG. 3 as being within the trusted execution environment 303F are for illustrative purposes only, and, in some embodiments different combinations of tasks and/or data processing may be executed within the trusted execution environment 303F. In contrast to existing solutions which may require a single trusted proxy, or a complex infrastructure requiring integrations between bank servers PG's (discussed above), one technical advantage of the present disclosure is that a node 300, which may not be affiliated with a particular issuer, may nevertheless still be trusted to authenticate policies of the issuer. In this way, the present disclosure enables greater flexibility than existing solutions in providing user privacy and integrity of transactions.

Turning to specific modules of the computer readable medium 303D, the communication module 303D-1 may comprise code that causes the processor 303A to generate messages, forward (or route) messages, reformat messages, and/or otherwise communicate with other entities. In one example, the communication module 303D-1 of node 300 (operating as a reception node) may receive a request from a merchant server for an interaction identifier. The communication module 303D-1 may then process the request and invoke the dynamic data element generation module 303D-2 to generate the interaction identifier (discussed below). In another example, the communication module 303D-1 of node 300 (operating as a first node 103) may receive an initial authorization request message from the user device 102, and invoke the authentication module 303D-4 with the authorization capsule 202 as an input. In yet another example, the communication module 303D-1 of node 300 (operating as a second or third node 103) may receive an authorization request message from an agent device, and invoke the authentication module 303D-4 with the authorization capsule 202 as an input.

In some embodiments, in order to route messages to another node in the proxy network 101, the sending node first formats the message in a format that the receiving node may interpret. Concretely, during an initialization phase, each node may upload a particular mapping to the proxy network 101, whereby the mapping specifies the particular format that the node requests messages be delivered in (e.g., XML, JSON formats). The communication module 303D-1 may also be responsible for updating scripts (e.g. JavaScript) to enable a merchant to integrate the payment on delivery service into the merchant's checkout service. As an example, the payment gateway may prepare an updated JavaScript for the merchant to download and perform a hot module replacement. The merchant website may then use this website to interact with the proxy network, for example, by requesting an interaction identifier (handle) for a particular transaction.

The dynamic data element generation module 303D-2 may comprise code that causes the processor 303A to generate a dynamic data element. Dynamic data elements are dynamic in the sense that they can change with each interaction, and are difficult for a fraudster to skim, such as a randomly generated number (e.g., Nonce), time of day, GPS coordinates, etc. In embodiments of the invention, the dynamic data element may be associated with a particular interaction (e.g., transaction) to generate a unique identifier. As an example, a reception node may receive a request from a merchant that includes a user cart information (e.g., items being ordered) and a payment gateway that merchant has a pre-existing association with (i.e., the target payment gateway). Based on this information, the dynamic data element generation module 303D-2 may generate dynamic data element associated with the interaction. As described above, the dynamic data element may be a concatenated string the form pg_id||Nonce, where the "pg_id" corresponds to a node identifier of the target payment gateway (e.g., second node 104), and the "Nonce" is a random unique number corresponding to the interaction (e.g., transaction information). As described above, this dynamic data element and the corresponding associations may be stored in database 303E.

The enroll module 303D-3 may comprise code that causes the processor 303A to enroll a node 300 into the proxy network 101. As an example, an entity (e.g., third-party payment service provider operating a payment gateway) may enroll a node 300 by invoking the enroll module 303D-3 and providing as an input a digital signature and a public/secret key (e.g., $PK_{N2}$, $SK_{N2}$) of the third party (e.g., second node 104). The secret key of the third party payment gateway may be later used to decrypt a re-encrypted authorization capsule 202 (e.g., step S132 of FIG. 1). In an example, the enroll module 303D-3 may establish a secure connection with a mediary node of the proxy network, whereby the mediary may verify the third party signature and public key ($PK_{N2}$) and provide a certificate of enrollment to the node 300. The proxy mediary may also share the proxy network public/secret key pair (shared amongst the nodes of the proxy network 101), which may be used by any node 300 to decrypt authorization capsule 202 or encrypted user data received, for example, within an initial authorization request message. In some embodiments, the one or more of the secret keys (e.g., third party payment gateway secret key, or shared proxy network secret key) may be isolated from the node 300 OS within an enclave of the trusted execution environment 303F.

The authentication module (e.g., enclave) 303D-4 may comprise code that causes the processor 303A to receive an authorization capsule 202 and user data (e.g., device attributes, user behavioral data metrics) and execute authentication algorithms based on the user data and authentication policies 204 specified in the authorization capsule 202. Prior to performing the authentication, the authentication module 303D-4 (e.g., by invoking the encryption/decryption module 303D-6) may decrypt both the authorization capsule 202 and the user data, for example, using the shared secret key of the proxy network nodes (received by the node 300 during enrollment). In this way, all of the user data and the authentication policies 204 of the authorizing entity 105 may remain private and tamper-proof. Upon successful completion of the authentication process, the authentication module 303D-4 may initiate a re-encryption of the CT 214 by invoking the encryption/decryption module 303D-6, and using as an input the appropriate RK within the whitelist 206. As discussed earlier, the authentication module 303D-4 may determine the appropriate RK based on the interaction identifier and the list of node identifiers 207. Upon completion of the authentication process, the authentication module 303D-4 may also produce a proof of authentication, and invoke the audit module 303D-5 (discussed below) to log the proof of authentication to the blockchain. The proof of authentication may be of any suitable data form (e.g., digitally signed with the shared cryptographic key of the proxy network node).

The audit module 303D-5 may comprise code that causes the processor 303A receive a proof of authentication from the authentication module 303D-4 and log the proof of authentication to the blockchain. The logging process may comprise both logging the proof of authentication locally (e.g., to database 303E), as well as transmitting the log to other nodes maintaining the blockchain, so that the audit module 303D-5 of each node commits the proof of authentication to the blockchain.

It should be understood that there may be multiple logs that are committed to the blockchain for a given transaction. For example, referencing FIG. 1, the first node 103 may log the proof of authentication at step S126. Later, upon receiving a pre-authorization from the authorizing entity 105 at step S136, the second node 104 may also log the pre-authorization response (e.g., pre-authorization approval indicator) to the blockchain. Additionally, in a payment on delivery transaction, the subsequent authentication process and authorization request message (discussed further in reference to FIG. 6) transmitted following the delivery of the resource may each, respectively cause logs to be committed to the blockchain in a similar manner as described above. In some embodiments, the log entry may contain data including a digital signature (e.g., generated by the audit module 303D-5, an identifier corresponding to the authorization capsule 202, the proof of authentication, and a hash of the RK of the target payment gateway (e.g., the second node 104)). In some embodiments, no sensitive personal information (e.g., PII/PAN data, user behavioral data) is present in the log entry.

It should also be understood that, while the trusted execution environment 303F provides for isolated execution of applications and confidentiality of assets (e.g., secret keys), the external storage mechanisms (e.g., database 303E) may not do so. Therefore, there is a risk that node 300 may become compromised and an untrusted process may tamper with or delete some of the blockchain logs that were previously stored. If uncorrected, this could lead to problems with the authentication process 303D-4, which may depend on logs for policy compliance (e.g., velocity checks, dispute resolution, etc.). Accordingly, one of the technical advantages of the present embodiment is that by having each node of the decentralized proxy network 101 maintain the blockchain, a single compromised node 300 that attempts to commit a fraudulent proof of authentication will be easily discovered by the other nodes when it tries to commit the fraudulent proof to the other nodes. This may be enabled, for example, by a mediary node of the proxy network which conducts periodic audits of the blockchain. Any suitable auditing mechanism may be used to perform embodiments of the present disclosure. The blockchain thereby provides greater assurance of transaction fidelity, even with the possibility of compromised nodes of the proxy network 101.

The encryption/decryption module 303D-6 may include any suitable encryption/decryption algorithms to encrypt data in embodiments of the invention. As described above in reference to FIG. 1, the encryption/decryption module 303D-6 may include proxy re-encryption algorithms (e.g., BBS, AFGH, etc.) for generation of cryptographic keys, and for re-encryption and decryption. In addition, suitable data encryption/decryption algorithms may include DES, triple DES, AES, etc. The encryption module 303D-6 may utilize symmetric or asymmetric encryption techniques to encrypt and/or verify data. These algorithms may be used, for example, to decrypt the authorization capsule 202 or user data that is received from the user device 102 as part of the initial authorization request message or from the agent device as part of a subsequent authorization request message. The algorithms may also be used in routing encrypted data (e.g., authorization capsule 202, interaction identifier) to another node in the proxy network. The encryption/decryption module 303D-6 may also store encryption keys that can be used with such encryption/decryption algorithms. As an example, cryptographic keys that may be used by the encryption/decryption module 303D-6 may be securely stored in the trusted execution environment 303F.

Figure 4:
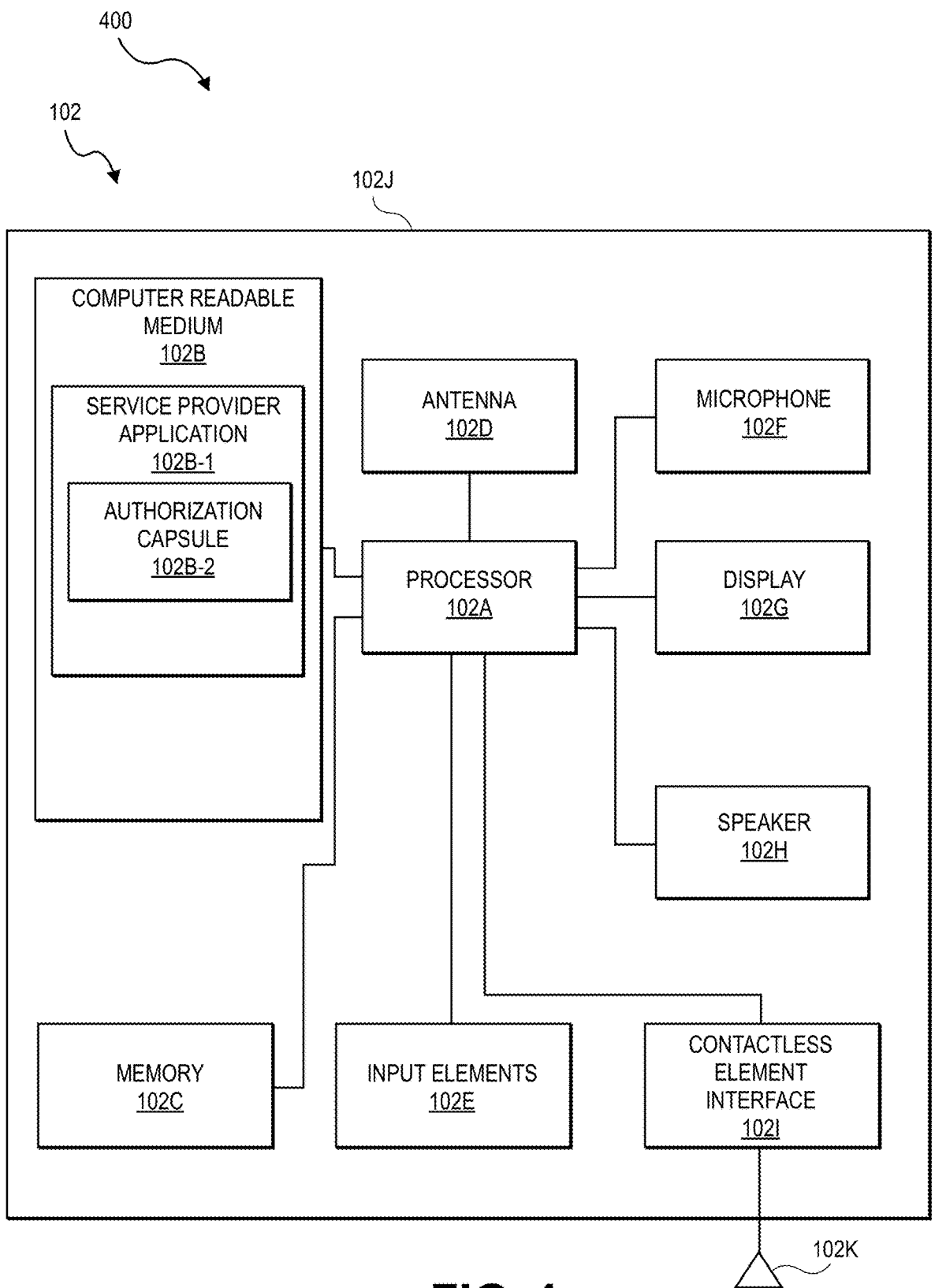
FIG. 4 shows a block diagram depicting an exemplary user device, according to an embodiment.

FIG. 4 shows a block diagram 400 depicting a user device, which may correspond to user device 102 of FIG. 1, according to an embodiment.

The user device 102 may include a processor 102A (e.g., a microprocessor) for processing the functions of the user device 102 and a display 102G to allow a user to view information. The user device 102 may further include input elements 102E (e.g., a touchscreen, keyboard, touchpad, sensors such as biometric sensors, etc.), a speaker 102H, and a microphone 102F, each of which is operatively coupled to the processor 102A. A contactless element interface 102I, an antenna 102D, a memory 102C, and a computer readable medium 102B may also be operatively coupled to the processor 102A.

The computer readable medium 102B and the memory 102C may be present within a body 102J. The body 102J may be in the form a housing, or other structure. In some cases, the memory 102C may be a secure element, and/or may also store information such as access data, including tokens, PANs, tickets, etc. Information in the memory 102C may be transmitted by the user device 102 to another device using an antenna 102D or contactless element interface 102I. The user device 102 may use antenna 102D for wireless data transfer (e.g., using wireless networking protocols such as IEEE (Institute of Electronics Engineers) 802.11) or mobile phone communication (e.g., 3G, 4G, and/or LTE). Antenna 102K of contactless element interface 102I may be configured for sending and receiving wireless signals at a frequency specified by different wireless protocols such as NFC (Near Field Communication), BLE (Bluetooth Low Energy), RFID (Radio Frequency Identifier), or any other suitable form of short or medium range communications mechanism.

In some embodiments, the contactless element interface 102I is implemented in the form of a semiconductor chip (or other data storage element) with an associated wireless transfer (e.g., data transmission) element, such as an antenna. Data or control instructions that are transmitted via a cellular network may be applied to the contactless element interface 102I. Contactless element interface 102I may be capable of transferring and receiving data using a short range wireless communication capability. Thus, the user device 102 may be capable of communicating and transferring data or control instructions via both a cellular network (or any other suitable wireless network—e.g., the Internet or other data network) or any short range communications mechanism.

The computer readable medium 102B may comprise code, executable by the processor, for implementing methods according to embodiments. For example, the computer readable medium 102B may comprise code, executable by the processor 102A for implementing a method comprising: generating, by a user device, an initial authorization request message for an interaction to obtain a resource from a resource provider; transmitting, by the user device to a first node in a proxy network, the initial authorization request message, wherein the first node subsequently processes the initial authorization request message and transmits a routing message to a second node in the proxy network based on the processing of the initial authorization request message, the second node being previously associated with the resource provider; receiving, by the user device from the second node in the proxy network, a pre-authorization approval indicator (PAAI); storing, by the user device; the pre-authorization approval indicator; transmitting, by the user device to an agent device of an agent of the resource provider, upon delivery of the resource by the agent, an authorization request message comprising the pre-authorization approval indicator, wherein the agent device further processes and transmits the authorization request message to the proxy network for authorization by an authorizing entity.

The computer readable medium 102B may contain one or more service provider applications 102B-1. The service provider applications 102B-1 may, in conjunction with the processor 102A, allow the user device 102 to communicate with various service provider computers (e.g., nodes in proxy network 101, an agent device payment on delivery application, merchant access device, etc.). Each application can provide functions provided by its respective service provider. Examples of service provider applications can include digital wallet applications, payment applications (e.g., a mobile banking application designed and maintained by a bank or payment processing network), and merchant applications (e.g., enabling a user's participation in a loyalty rewards). In some embodiments, a particular service provider application 102B-1 may support multiple payment options (e.g., credit card, debit card, cryptocurrency, etc.). Each service provider application 102B-1 may in turn be associated with one or more authorization capsules 102B-2. In an example, a digital wallet application may support multiple payment options with different issuers 105, and thus, there may be a different authorization capsule 102B-2 provisioned on user device 102 for each payment option. Furthermore, a particular authorization capsule 102B-2 may be associated with multiple service provider applications 102B-1 during the provisioning process (step S122, FIG. 1). In an example, "Bank 1" (e.g., authorizing entity 105) may provision an authorization capsule 102B-2 on the user device 102. "Bank 1" may be associated with different applications on the device (e.g., "Social Media Application 1", "Social Media Application 2"), and each application may support payment on delivery payments via "Bank 1." Accordingly, during the provisioning process, the user may be allowed to select which applications should be linked to the authorization capsule 102B-2 provisioned by "Bank 1," such that the user can execute a payment via one of those applications using their account at "Bank 1."

Figure 5:
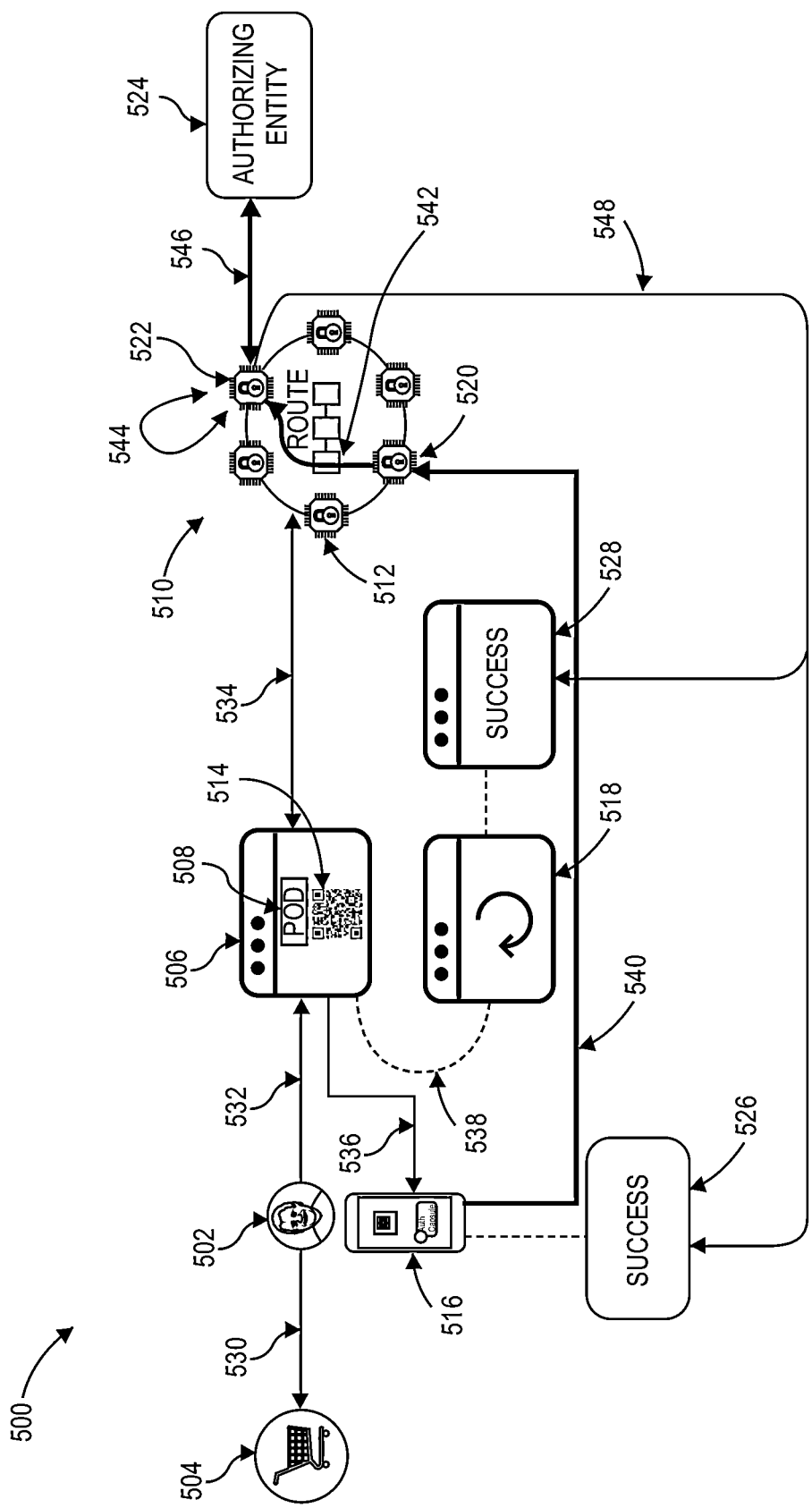
FIG. 5 shows a flow diagram depicting an exemplary message exchange process used to obtain a resource from a resource provider, according to an embodiment.

FIG. 5 shows a system diagram and a method depicting a message exchange process used to obtain a resource from a resource provider in a payment on delivery transaction, according to an embodiment. As discussed above, embodiments of the present disclosure may be performed in three distinct phases. Aspects of the first (e.g., deployment) phase were described in reference to FIGS. 1-4 (e.g., RK creation, provisioning of authorization capsule 202 on a user device 102, enrollment and initialization of nodes in a proxy network 101). The system diagram 500 of FIG. 5 depicts a system including a number of components for performing the second (e.g., pre-authorization) phase, according to an embodiment of the present disclosure.

In some embodiments, the system 500 comprises a user device 516 used by a user 502. Shopping cart 504 may correspond to a list or grouping of merchandise goods being added by user 502 to be purchased. In one embodiment, resource provider (e.g., merchant) interface 506 may correspond to a merchant website being visited remotely by the user. In other embodiments, merchant interface 506 may correspond to an access device on-location at the merchant shop. The access device may be connected to a merchant server or other display for user and/or merchant interaction. Payment on delivery button 508 may correspond to a button displayed on the merchant website, which the user 502 may press to initiate a request for pre-authorization in a payment on delivery transaction.

Proxy network 510 may correspond to proxy network 101, described earlier in reference to FIG. 1 and FIG. 3. Within proxy network 510, reception node 512 may be a node of the proxy network 510 that receives and processes a request from a merchant for an interaction identifier, to provide a handle for the transaction. QR code 514 may correspond to a representation of the interaction identifier that was received by from the reception node 512 to be displayed by the merchant (e.g., on the merchant website, access device, or other connected merchant display). Wait screen 518 may correspond to a "Wait" message displayed on a merchant interface, for example, on the website, while waiting for the pre-authorization to be completed. First node 520 may correspond to a node of the proxy network 510 which receives and processes an initial authorization request message from user device 516. Second node 522 may correspond a node of the proxy network 510 which is the target payment gateway that is affiliated with the merchant interface 506 (e.g., the payment gateway with whom the merchant has a pre-existing relationship to process transactions on the merchant's behalf). Authorizing entity 524 may correspond to authorizing entity 105, which is affiliated with the second node 522 (e.g., target payment gateway) and may be the issuer of the payment card which user 502 uses to execute the transaction. Success screen 526 may correspond to a "Success" message displayed on user device 516, for example, within a mobile banking application 102B-1 provided by the authorizing entity 524, upon confirmation that pre-authorization was completed. Success screen 528 may correspond to a "Success" message displayed on a merchant interface 506, for example, on the website, upon confirmation that pre-authorization was completed.

FIG. 5 also depicts a method for performing the second (e.g., pre-authorization) phase of a payment on delivery transaction, according to an embodiment of the present disclosure.

At step 530, the resource provider (e.g., via merchant website, or on-site access device) may receive an indication (e.g., button click) from the user 502 to add goods to a cart 504.

At step 532 the resource provider may receive an indication from the user that the user is submitting a request for pre-authorization (e.g., placing an order). For example, after adding goods to the cart, the user may select a payment method using an issuer 524 whom the user already has an account established with (e.g., "Credit Card 1", issued by "Bank 1"). At this point, the user may have already installed or upgraded the service provider application 102B-1 on their user device 516 which is associated with the payment on delivery payment method 508 selected on the merchant website, such that the authorizing entity 524 has provisioned an authorization capsule 202 to the user device 516.

At step 534, the merchant interface 506 (e.g., via the merchant server) transmits a message containing the order information to the proxy network 510 to obtain an interaction identifier. The order information may include details such as a list of the goods being ordered, the identity of the target payment gateway (e.g., pg_id value) that the merchant uses as a merchant service to process transactions, the merchant's authentication credentials, the transaction amount, the type of transaction (e.g., payment on delivery), etc. The reception node 512 of the proxy network 510 receives this message. In some embodiments, the reception node 512 may be the target payment gateway, having been forwarded the message by another node in the proxy network 510 based on the payment gateway identifier. In this case, the target payment gateway may authenticate the merchant's credentials, whereby the target payment gateway node 522 then invokes the dynamic data element generation module 303D-2 to generate the interaction identifier, and stores the transaction details (e.g., transaction amount, cart information) in association with the interaction identifier for future processing. The target payment gateway may then transmit the interaction identifier to each node in the proxy network 510 to be stored (e.g., database 303E) for future message routing. In other embodiments, the reception node 512 may be any node of the proxy network 510 that has been delegated the role of authenticating the merchant's credentials, generating the interaction identifier to be associated with the transaction details, and transmitting the interaction identifier to each node in the proxy network 510. In either case, once the interaction identifier is created and propagated to each node in the proxy network 510, the reception node 512 may then transmit the interaction identifier back to merchant interface 506.

At step 536, the merchant interface 506 may then display the interaction identifier for the user device 516 to receive as input. In some embodiments, the interaction identifier may be displayed in an audio, text, or any other suitable form whereby the user device 516 may receive the interaction identifier.

At step 538, the user device 516 receives the interaction identifier (e.g., scanning the QR code 514) being displayed via the merchant interface 506. In some embodiments, the merchant interface 506 may then display a "Wait" message 518 while the pre-authorization is being processed. In some embodiments, the user device 516 may also display a "Wait" message. The "Wait" message may be displayed in any suitable form.

At step 540, the user device 516 transmits an initial authorization request to the proxy network 510 based on receiving the interaction identifier in step 538. In an example, the service provider application 102B-1 was used to scan the QR code 514 in step 538. The service provider application 102B-1 recognizes the interaction identifier as being associated with a payment on delivery transaction, and transmits the initial authorization request, which may include several elements. In some embodiments, the initial authorization request may include the interaction identifier, encrypted user data (e.g., metadata), and the encrypted authorization capsule 202 that was provisioned on the user device. The user data may include, for example, a history of user behavioral data and user preferences that were stored by the service provider application 102B-1. The user data may also include user authentication data (e.g., username/password, biometric data, PINs) and/or device authentication data (device serial numbers, hardware secure element identifiers, device fingerprints, phone numbers, IMEI numbers, etc.).

At step 542, a first node 520 of proxy network 510 receives the initial authorization request, performs authentication based on the initial authorization request, logs the proof of authentication to the blockchain, re-encrypts the encrypted credentials 214 in the authorization capsule 202, and finally transmits a routing message including the re-encrypted credentials and the interaction identifier to a second node 522 (e.g., the target payment gateway). In some embodiments, the first node may first invoke the encryption/decryption module 303D-6 within the trusted execution environment 303F to decrypt both the user data and the authorization capsule 202 using a shared cryptographic key of the proxy network 510. After performing the decryption, the first node 520 may invoke the authentication module 303D-4 within trusted execution environment 303F to perform authentication using the decrypted user data and authentication (risk) policies 204 within the decrypted authorization capsule 202. The authentication process may output a proof of authentication, upon which the audit module 303D-5 is invoked to log the proof of authentication to the blockchain. As described above, the first node 520 may then use the interaction identifier (e.g., random_nonce||pg_id), in conjunction with the list of node identifiers 207 and the whitelist of RKs 206, to determine the correct RK based on the matching payment gateway identifier. If the payment gateway identifier is not found in the whitelist, the first node 520 may return an error message to the user device 516 and/or merchant interface 506 and terminate the transaction. This would indicate that the payment gateway used by the merchant is not supported by the authorizing entity 524. However, if there is a match, the first node 520 may re-encrypt the encrypted credentials 214, for example, by invoking the encrypt/decrypt module 303D-6 to utilize one of the proxy re-encryption schemes described in reference to FIG. 1. After re-encrypting the credentials 214, the first node 520 may transmit a routing message including the re-encrypted credentials and the interaction identifier to the second node 522. In some embodiments, the first node 510 may also transmit the authorization capsule 202 to other nodes in the proxy network 510 to be used later for quick retrieval and authentication. (e.g., FIG. 6, step 630).

At step 544, the second node 522 may receive the routing message including re-encrypted credentials and the interaction identifier from the first node 520 and decrypt the re-encrypted credentials using a secret key of the second node 522 to obtain the plaintext credentials (e.g., PII/PAN data). In some embodiments, the second node 522 may decrypt the re-encrypted credentials by invoking the encrypt/decrypt module 303D-6 to utilize one of the proxy re-encryption schemes described in reference to FIG. 1. In some embodiments, the interaction identifier received by the second node 522 from first node 520 may also contain a user device identifier (e.g., which may be derived from the user data sent from the user device at step 540).

At step 546, the second node 522 may transmit, based on the interaction identifier and the plaintext credentials, a pre-authorization request message to the authorizing entity 524. The authorizing entity 524 can determine if the transaction is authorized or not, and can generate a pre-authorization response message and transmit the same back to the second node 522. The second node may receive the pre-authorization response from authorizing entity 524.

In some embodiments, the second node 522 may use the interaction identifier to retrieve from the database 303E information about the transaction (e.g., received and stored by the reception node 512 at step 534). The pre-authorization request message may in turn include transaction information associated with the interaction identifier and the plaintext credentials. The authorizing entity 524 may receive the pre-authorization request message and transmit a pre-authorization response that includes a pre-authorization approval indicator (PAAI). The pre-authorization approval indicator may correspond to a proof of pre-authorization, to be used during the third phase. The pre-authorization approval indicator may be represented in any suitable form (e.g., an authorization code signed with the public key of the authorizing entity 524). In some embodiments, the pre-authorization approval indicator may also contain an interaction identifier for later retrieval by the user device 516. (As discussed herein, the pre-authorization approval indicator may be used interchangeably with the pre-authorization response.) It should be understood that, the authorizing entity 524 may be an issuer that issued the payment card being used (e.g., bank), or a representative entity of the issuer (e.g., credit card association).

At step 548, upon receiving the pre-authorization response from the authorizing entity 524, the second node 522 may log the pre-authorization approval indicator to the blockchain by invoking the audit module 303D-5. As discussed above, these logs may be used by the proxy network to periodically perform audits on the blockchain to ensure the integrity of the blockchain ledger. The second node 522 may then transmit the pre-authorization approval indicator to the user device 516, based on the user device identifier previously received. The second node 522 may also transmit a message to the merchant interface 506 corresponding to the pre-authorization approval indicator (e.g., pre-approval Approved/Denied). Upon receiving the pre-authorization approval indicator, the merchant interface 506 may display a "Success" message 528 to the user. Additionally, the user device 516 may also display a "Success" message 526. The user device 516 may also store the pre-authorization approval indicator to the device 516 (e.g., within memory 102C).

In the above processes and other processes, that that is received by the second node 522 and the authorizing entity 524 can be converted from one format to another. For example, messages received by the second node 522 can be in an HTTP message format, and a new authorization request message in an ISO 8532 message format may be used to communicate with the authorizing entity 524.

Figure 6:
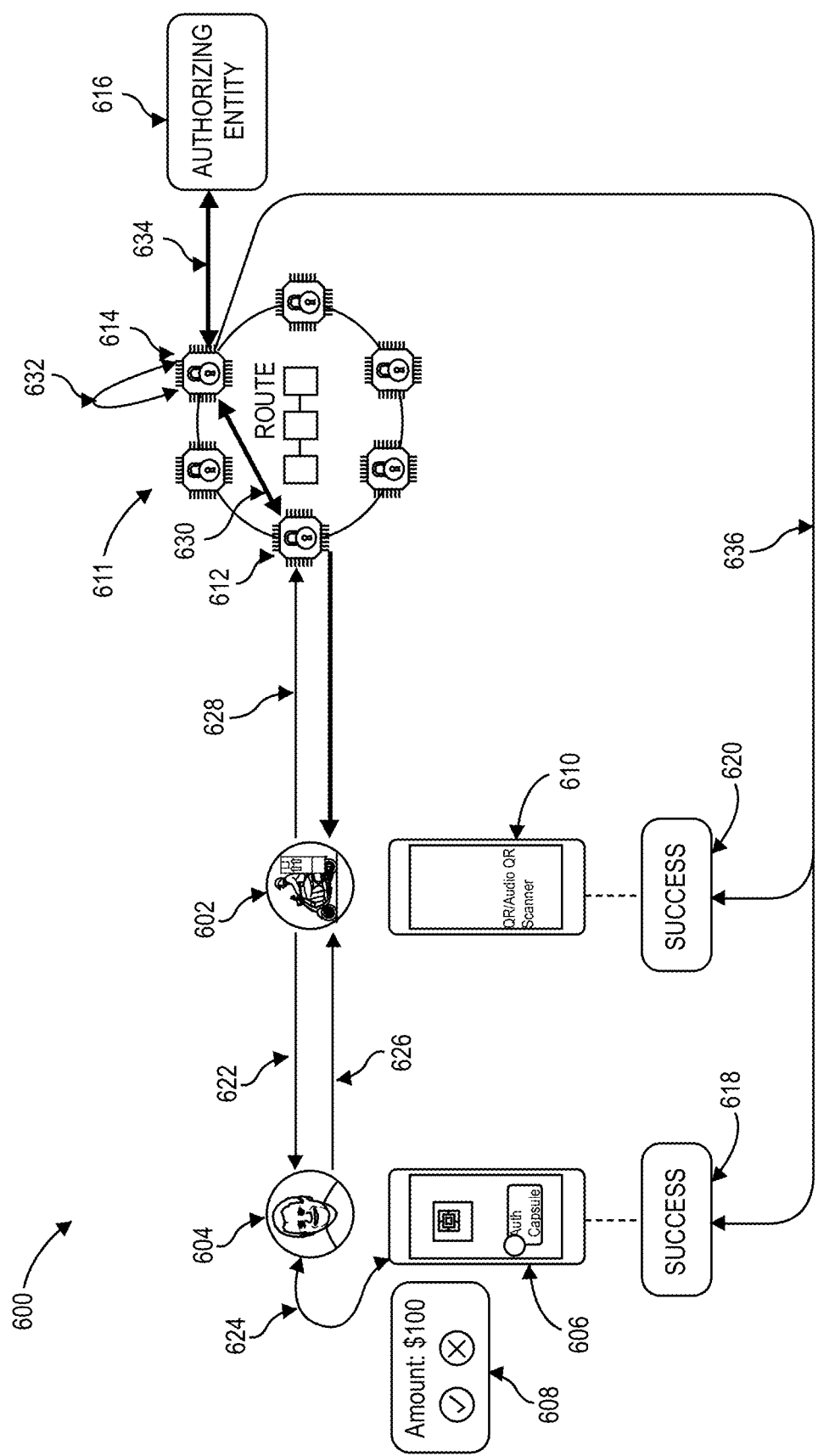
FIG. 6 shows a flow diagram depicting another exemplary message exchange process used to obtain a resource from a resource provider, according to an embodiment.

FIG. 6 shows a system diagram and a method diagram depicting a message exchange process used to obtain a resource from a resource provider in a payment on delivery transaction, according to an embodiment. The system diagram 600 of FIG. 6 depicts a system including a number of components for performing the third (e.g., delivery and authorization) phase, according to an embodiment of the present disclosure.

In some embodiments, the system 600 comprises a user device 606 (which may correspond to user device 516) used by a user 604 (which may correspond to user 502). Upon launching the service provider application 102B-1, the user device 606 may display a QR code, depicted as being displayed on user device 606. The user device 606 may subsequently display a user consent screen 608. From this user consent screen 608, the user may consent to payment and input a digital signature. In some embodiments, as discussed below, the user consent screen 608 may display a modified transaction amount (e.g., if the goods were damaged in transit, and delivery agent lowers the original price to a reduced price). Agent payment on delivery application 610 corresponds to an application running on an agent device (e.g., mobile device) of the delivery agent 602. In some embodiments, the agent payment on delivery application 610 may display a scanning screen used for scanning a QR code. In some embodiments, the agent payment on delivery application 610 may display a price adjustment screen, allowing the delivery agent to modify the original price to a reduced price. The agent payment on delivery application 610 may also allow the delivery agent 602 to review the transaction details and input a digital signature. The agent payment on delivery application 610 may also be able to receive and process different types of authorization capsules 202 for transmission to the proxy network 611, each authorization capsule corresponding to a different issuer (e.g., a bank, a cryptocurrency payment account issuer, etc.). In this way, the delivery agent may use a single agent payment on delivery application 610 to process multiple types of transactions from a user 604. As described earlier, this method of using a single agent payment on delivery application 610 to process multiple types of transactions provides a technical advantage over existing methods (which may require different applications) by reducing the time an agent 604 spends managing different payment mechanisms on their mobile device and reducing the risk of error in processing a payment transaction.

Proxy network 611 may correspond to proxy network 510 of FIG. 5. Third node 612 may correspond to may correspond to a node of the proxy network 611 which receives and processes an authorization request message from agent payment on delivery application 610. Second node 614 (e.g., target payment gateway) may correspond to second node 522 of FIG. 5. Authorizing entity 616 may correspond to authorizing entity 524 of FIG. 5. Success screen 618 may correspond to a "Success" message displayed on user device 606, for example, within a mobile banking application 102B-1 provided by the authorizing entity 524, upon confirmation that the authorization was completed. Success screen 620 may correspond to a "Success" message displayed on the agent payment on delivery application 610, for example, upon confirmation that authorization was completed.

FIG. 6 also depicts a method for performing the third (e.g., authorization) phase of a payment on delivery transaction, according to an embodiment of the present disclosure.

At step 622, upon delivery of goods by the delivery agent 602 to the user 604, the user device 606 may launch the mobile banking application 102B-1 that initially submitted the pre-authorization request (e.g., step 540) and stored the pre-authorization approval indicator (step 548). In some embodiments, prior to the delivery, the agent payment on delivery application 610 may receive information about the transaction (e.g., transaction amount, order information, transaction identifier, merchant server identifier, target payment gateway node identifier) from the merchant server 506. This information may be later used (e.g., step 628) by the agent payment on delivery application 610 to submit an authorization request to the proxy network 611. Returning to the user device 606, upon launch, the mobile banking application 102B-1 may in turn display a QR code on the user device 606. The QR code may correspond to the order that was previously placed in phase two (e.g., via transaction information such as the pre-authorization approval indicator that was previously stored on the user device). Prior to scanning the QR code by the agent payment on delivery application 610, in an example, where the some of the goods may have been damaged (or lost) in transit, the agent 602 may agree to lower the price. The agent may update the price on the agent device 602 (not shown). Accordingly, upon the agent payment on delivery application 610 scanning the QR code on user device 606, the mobile banking application 102B-1 may prompt the user 604 for a signature (e.g., digital signature). As discussed in reference to FIG. 5, any suitable mechanism may be used to communicate transaction information between the user device 606 and the agent payment on delivery application 610.

At step 624, the user device 606 receives the digital signature from the user 604 to proceed with authorizing the payment. In an example, the user checks a box in the user consent screen 608 to indicate their signature. In some embodiments, the user consent screen 608 may indicate that price has been updated (e.g., "Original: $100, Updated price: $50").

At step 626, the agent payment on delivery application 610 receives from the user device 606 the user's 604 digital signature, the pre-authorization approval indicator for the transaction, user data (e.g., including a user device identifier, user authentication data, user behavioral data metrics, etc.), and the authorization capsule 202 associated with the mobile banking application 102B-1. As discussed earlier, in some embodiments, the nodes of the proxy network 611 may already have stored a copy of the authorization capsule 202 (e.g., transmitted by the first node 512 at step 542). In that case, the user device 606 may only transmit an authorization capsule identifier (e.g., ac_id value) that corresponds to the authorization capsule. In an example, the authorization capsule identifier may correspond to a hash of the authorization capsule 202, the hash being performed using any suitable mechanism.

At step 628, the agent device (e.g., agent payment on delivery application 610) transmits to the proxy network 611 an authorization request message (which may also be referred to as a "subsequent authorization request message," in the sense that it is subsequent to the pre-authorization request message originally sent by the second node 522 in step 546). In some embodiments, the authorization request message may contain several elements, including the user 604 digital signature, the agent 602 digital signature, user data, a second interaction identifier, the pre-authorization approval indicator, and the authorization capsule 202 (or authorization capsule identifier). In some embodiments, the second interaction identifier may include, for example, transaction information previously received from the merchant server by the agent payment on delivery application 610 in step 622). In some embodiments, one or more of the elements of the authorization request message may be encrypted (e.g., using a shared cryptographic key of the proxy network 611).

At step 630, a third node 612 receives the authorization request message from the agent payment on delivery application 610 and performs several operations. These operations may be similar to the operations performed at step 542 by the first node 520 of FIG. 5. In particular, the third node 612 may decrypt the authorization capsule 202 and user data and perform authentication against authentication policies 204. As discussed above, the third node 612 may either receive the authorization capsule 202 directly from the agent payment on delivery application 610, or retrieve the authorization capsule 202 from database 303E based on an authorization capsule identifier received from the agent payment on delivery application 610. In some embodiments, the authentication may be performed again (in addition to authentication in step 542) to provide an additional measure of transaction security. The authentication process may again output a proof of authentication, which is logged to the blockchain. Additionally, the third node 612 may also verify the digital signatures of both the user 604 and the delivery agent 602. The third node 612 may also verify the pre-authorization approval indicator, which was previously logged to the blockchain in step 548. The third node 612 may then re-encrypt the encrypted credentials 214 in a similar manner as described in step 542. Finally, the third node 612 may transmit a routing message to the second node 614, the routing message including the re-encrypted credentials and a second interaction identifier (e.g., which may correspond to one or more of the elements included in the second interaction identifier and/or user data earlier received by the third node 612 from the agent device 610 in step 628). It should be understood that, in some embodiments, the third node 612 may be the same node as the first node 512, or may be a different node. Furthermore, it is also possible that the second node (i.e., target payment gateway) may be the same node as the first node 512 (in phase two) or the third node 612 (in phase three), in which case there is no need to route the message to another node in the proxy network 611. In that case, both the re-encryption and decryption of the encrypted credentials 214 could be performed on the same second node 614.

At step 632, and similar to step 544, the second node 614 may receive the routing message including the re-encrypted credentials and the second interaction identifier from the third node 612 and decrypt the re-encrypted credentials using a secret key of the second node 522 to obtain the plaintext credentials (e.g., PII/PAN data).

At step 634, similar to step 546, based on the second interaction identifier and the plaintext credentials, the second node 614 transmits an authorization request message to the authorizing entity 616 and receives a (final) authorization response. In some embodiments, the authorization request message may include the pre-authorization approval indicator, the plaintext credentials, and interaction data (e.g., transaction information based on the second interaction identifier). The second node 614 may then log the authorization response to the blockchain.

At step 636, upon receiving the authorization response from the authorizing entity 616, the second node 614 may transmit the authorization response to the agent payment on delivery application 610 and/or the user device 606 to confirm that the payment has been approved or denied. In some embodiments, the agent payment on delivery application 610 may display a "Success" screen and/or the agent payment on delivery application 610 may also display a "Success" screen. In some embodiments, the second node 614 may transmit the authorization response to the agent payment on delivery application 610, which may in turn forward the response to the user device 606 using any suitable mechanism (e.g. scanning a QR code containing the response).

At the end of the day or any other suitable period of time, in some embodiments, a settlement process may occur between a bank associated with the merchant, the authorizing entity 616 and a payment processing network.

It should be understood that any of the embodiments of the present disclosure can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present disclosure using hardware and a combination of hardware and software.

Any of the software components or functions described in this application may be implemented as software code to be executed by a processor using any suitable computer language such as, for example, Java, C, C++, C #, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present disclosure may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the disclosure will become apparent to those skilled in the art upon review of the disclosure. The scope of the disclosure should, therefore, be determined not with reference to the above description, but instead should be determined with reference to the pending claims along with their full scope or equivalents.

One or more features from any embodiment may be combined with one or more features of any other embodiment without departing from the scope of the disclosure.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:
generating, by a user device operated by a user, an initial authorization request message for an interaction to obtain a resource from a resource provider;
transmitting, by the user device to a first node in a proxy network, the initial authorization request message, wherein the first node subsequently processes the initial authorization request message and transmits a routing message to a second node in the proxy network based on the processing of the initial authorization request message;
receiving, by the user device from the second node in the proxy network, a pre-authorization approval indicator (PAAI);
storing, by the user device, the pre-authorization approval indicator; and
providing, by the user device to an agent device of an agent of the resource provider, the pre-authorization approval indicator, wherein the agent device further processes and transmits an authorization request message comprising the pre-authorization approval indicator to the proxy network for authorization by an authorizing entity,
wherein the initial authorization request message comprises an interaction identifier, user data and an authorization capsule, the authorization capsule being associated with the authorizing entity and comprising risk policies, encrypted credentials of the user, a plurality of re-encryption keys respectively associated with nodes in the proxy network, and a plurality of node identifiers respectively associated with the re-encryption keys.

2. The method of claim 1, further comprising:
communicating, by the user device with a resource provider interface of the resource provider, and wherein the interaction identifier was obtained based on detecting a quick response (QR) code presented by the resource provider interface.

3. The method of claim 1, wherein the first node performs authentication using the user data and the risk policies in the authorization capsule.

4. The method of claim 3, wherein the first node
determines a re-encryption key of the plurality of re-encryption keys using the interaction identifier and the node identifiers in the authorization capsule, the re-encryption key associated with the second node of the proxy network; and
re-encrypts, using the re-encryption key associated with the second node, the encrypted credentials to form re-encrypted credentials,
wherein the routing message comprises the re-encrypted credentials.

5. The method of claim 4, wherein the second node decrypts the re-encrypted credentials using a secret key of the second node to obtain plaintext credentials, and then generates and transmits a pre-authorization request message to the authorizing entity for approval, wherein the pre-authorization request message requests pre-authorization for the interaction.

6. The method of claim 1, wherein the method further comprises:
receiving the authorization capsule from the authorizing entity.

7. The method of claim 1, wherein the agent is a delivery agent.

8. The method of claim 1, wherein the user device is a mobile phone.

9. The method of claim 1, wherein the agent device is a mobile phone.

10. The method of claim 1, wherein the interaction identifier was obtained from the resource provider, which obtained the interaction identifier from the proxy network.

11. The method of claim 1, wherein the encrypted credentials comprise an encrypted primary account number.

12. A method comprising:
generating, by a user device operated by a user, an initial authorization request message for an interaction to obtain a resource from a resource provider;
transmitting, by the user device to a first node in a proxy network, the initial authorization request message, wherein the first node subsequently processes the initial authorization request message and transmits a routing message to a second node in the proxy network based on the processing of the initial authorization request message;
receiving, by the user device from the second node in the proxy network, a pre-authorization approval indicator (PAAI);
storing, by the user device, the pre-authorization approval indicator; and
providing, by the user device to an agent device of an agent of the resource provider, the pre-authorization approval indicator, wherein the agent device further processes and transmits an authorization request message comprising the pre-authorization approval indicator to the proxy network for authorization by an authorizing entity, and wherein the method further comprises:
communicating, by the user device with a resource provider interface of the resource provider, and wherein the initial authorization request message comprises an interaction identifier that was obtained based on detecting a quick response (QR) code presented by the resource provider interface, and
wherein the QR code is a first QR code, and wherein upon delivery of the resource by the agent, the user device presents a second QR code to the agent device, the second QR code derived based on the pre-authorization approval indicator, and wherein the agent device processes and transmits the authorization request message after the agent device detects the second QR code.

13. A method comprising:
generating, by a user device operated by a user, an initial authorization request message for an interaction to obtain a resource from a resource provider;
transmitting, by the user device to a first node in a proxy network, the initial authorization request message, wherein the first node subsequently processes the initial authorization request message and transmits a routing message to a second node in the proxy network based on the processing of the initial authorization request message;
receiving, by the user device from the second node in the proxy network, a pre-authorization approval indicator (PAAI);
storing, by the user device, the pre-authorization approval indicator; and
providing, by the user device to an agent device of an agent of the resource provider, the pre-authorization approval indicator, wherein the agent device further processes and transmits an authorization request message comprising the pre-authorization approval indicator to the proxy network for authorization by an authorizing entity, and wherein the method further comprises:
communicating, by the user device with a resource provider interface of the resource provider, and wherein the initial authorization request message comprises an interaction identifier that was obtained based on detecting a quick response (QR) code presented by the resource provider interface, and
wherein the initial authorization request message comprises user data and an authorization capsule, the authorization capsule being associated with the authorizing entity and comprising risk policies, encrypted credentials of the user, a plurality of re-encryption keys respectively associated with nodes in the proxy network, and a plurality of node identifiers respectively associated with the re-encryption keys, wherein the user data comprises user authentication data or user device authentication data.

14. A user device comprising:
a processor; and
a non-transitory computer readable medium comprising code executable by the processor to implement operations comprising:
generating an initial authorization request message for an interaction to obtain a resource from a resource provider,
transmitting, to a first node in a proxy network, the initial authorization request message, wherein the first node subsequently processes the initial authorization request message and transmits a routing message to a second node in the proxy network based on the processing of the initial authorization request message, receiving, from the second node in the proxy network, a pre-authorization approval indicator (PAAI), storing the pre-authorization approval indicator, and providing, to an agent device of an agent of the resource provider, the pre-authorization approval indicator, wherein the agent device further processes and transmits an authorization request message comprising the pre-authorization approval indicator to the proxy network for authorization by an authorizing entity, wherein the initial authorization request message comprises an interaction identifier, user data and an authorization capsule, the authorization capsule being associated with the authorizing entity and comprising risk policies, encrypted credentials of a user, a plurality of re-encryption keys respectively associated with nodes in the proxy network, and a plurality of node identifiers respectively associated with the re-encryption keys.

15. The user device of claim 14, wherein the user device is a mobile phone.

16. The user device of claim 14, wherein the operations further comprise:

communicating, with a resource provider interface of the resource provider, and wherein the interaction identifier was obtained based on detecting a quick response (QR) code presented by the resource provider interface.

17. The user device of claim 14, wherein the interaction identifier was obtained from the resource provider, which obtained the interaction identifier from the proxy network.

18. The user device of claim 14, wherein the operations further comprise:

receiving the authorization capsule from the authorizing entity.

19. A system comprising:

a proxy network;

a user device comprising:

a processor, and a non-transitory computer readable medium comprising code executable by the processor to implement operations comprising:

generating an initial authorization request message for an interaction to obtain a resource from a resource provider, transmitting, to a first node in the proxy network, the initial authorization request message, wherein the first node subsequently processes the initial authorization request message and transmits a routing message to a second node in the proxy network based on the processing of the initial authorization request message;

receiving, from the second node in the proxy network, a pre-authorization approval indicator (PAAI), storing the pre-authorization approval indicator, and providing, to an agent device of an agent of the resource provider, upon delivery of the resource by the agent, the pre-authorization approval indicator, wherein the agent device further processes and transmits an authorization request message comprising the pre-authorization approval indicator to the proxy network for authorization by an authorizing entity, wherein the initial authorization request message comprises an interaction identifier, user data and an authorization capsule, the authorization capsule being associated with the authorizing entity and comprising risk policies, encrypted credentials of a user, a plurality of re-encryption keys respectively associated with nodes in the proxy network, and a plurality of node identifiers respectively associated with the re-encryption keys.

20. The system of claim 19, wherein the resource provider operates a resource provider computer, and the system further comprises the resource provider computer.

* * * * *